(12) United States Patent
Kim et al.

(10) Patent No.: US 9,854,446 B2
(45) Date of Patent: Dec. 26, 2017

(54) METHOD AND APPARATUS FOR TRANSMITTING A SIGNAL IN A WIRELESS COMMUNICATION SYSTEM

(75) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 277 days.

(21) Appl. No.: 14/127,904

(22) PCT Filed: Jul. 6, 2012

(86) PCT No.: PCT/KR2012/005358
§ 371 (c)(1),
(2), (4) Date: Dec. 19, 2013

(87) PCT Pub. No.: WO2013/006006
PCT Pub. Date: Jan. 10, 2013

(65) Prior Publication Data
US 2014/0112289 A1    Apr. 24, 2014

Related U.S. Application Data

(60) Provisional application No. 61/505,508, filed on Jul. 7, 2011.

(51) Int. Cl.
*H04W 16/14* (2009.01)
*H04W 28/26* (2009.01)
(Continued)

(52) U.S. Cl.
CPC ........... *H04W 16/14* (2013.01); *H04L 5/0044* (2013.01); *H04L 5/0078* (2013.01); *H04W 28/26* (2013.01);
(Continued)

(58) Field of Classification Search
CPC ..... H04W 16/14; H04W 28/26; H04W 56/00; H04W 74/0808; H04L 5/0078;
(Continued)

(56) References Cited

U.S. PATENT DOCUMENTS

2004/0233888 A1* 11/2004 Bonta .................. H04W 16/14
                                                370/350
2008/0176571 A1*  7/2008 Choi ............................ 455/436
(Continued)

FOREIGN PATENT DOCUMENTS

| KR | 10-2009-0083760 A | 8/2009 |
| WO | WO 2009/057483 A1 | 5/2009 |
| WO | WO 2010/101444 A2 | 9/2010 |

*Primary Examiner* — Christopher Grey
*Assistant Examiner* — Wilfred Thomas
(74) *Attorney, Agent, or Firm* — Birch, Stewart, Kolasch & Birch, LLP

(57) ABSTRACT

One embodiment of the present invention relates to a method for transmitting a signal to an unlicensed band of a base station in a wireless communication system. The method comprises the steps of: transmitting at least one of a preamble and a reservation signal, if it is determined through carrier sensing that the unlicensed band is available; and transmitting a PDSCH on the unlicensed band immediately after the transmission of at least one of the preamble and the reservation signal. the preamble enables a terminal to acquire reception synchronization for at least one of the reservation signal and the PDSCH.

8 Claims, 27 Drawing Sheets

(51) Int. Cl.
*H04W 74/08* (2009.01)
*H04W 56/00* (2009.01)
*H04L 5/00* (2006.01)
*H04L 27/00* (2006.01)

(52) U.S. Cl.
CPC ....... *H04W 56/00* (2013.01); *H04W 74/0808* (2013.01); *H04L 5/001* (2013.01); *H04L 5/0053* (2013.01); *H04L 27/0006* (2013.01)

(58) Field of Classification Search
CPC ..... H04L 5/0044; H04L 5/001; H04L 5/0053; H04L 27/0006
See application file for complete search history.

(56) References Cited

U.S. PATENT DOCUMENTS

| | | |
|---|---|---|
| 2008/0220787 A1 | 9/2008 | Stanwood et al. |
| 2009/0190566 A1 | 7/2009 | Kwon et al. |
| 2010/0226343 A1 | 9/2010 | Hsu et al. |
| 2010/0255867 A1 | 10/2010 | Ishii et al. |
| 2011/0039499 A1* | 2/2011 | Zhang et al. ............... 455/67.11 |
| 2011/0287794 A1* | 11/2011 | Koskela ................ H04W 28/08 455/509 |
| 2012/0077510 A1* | 3/2012 | Chen ..................... H04W 28/26 455/452.1 |
| 2012/0140714 A1* | 6/2012 | Koskela ................ H04W 56/00 370/329 |
| 2013/0142177 A1* | 6/2013 | Nentwig ....................... 370/336 |
| 2013/0336156 A1* | 12/2013 | Wei ......................... H04L 5/001 370/252 |
| 2014/0031054 A1* | 1/2014 | Zou et al. .................. 455/452.2 |

\* cited by examiner

FIG. 9
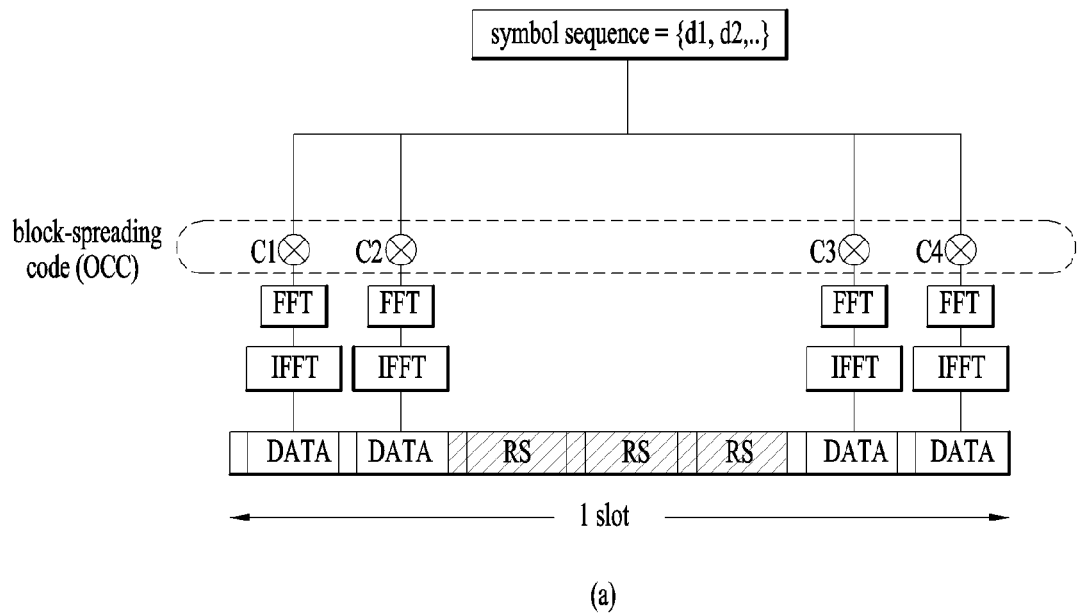
(a)
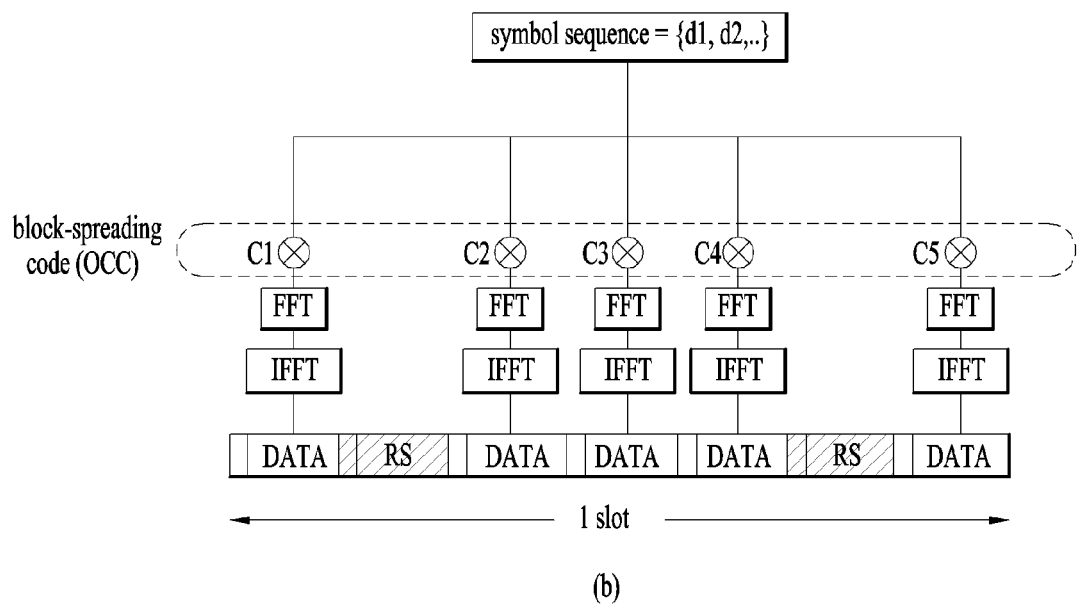
(b)

FIG. 10
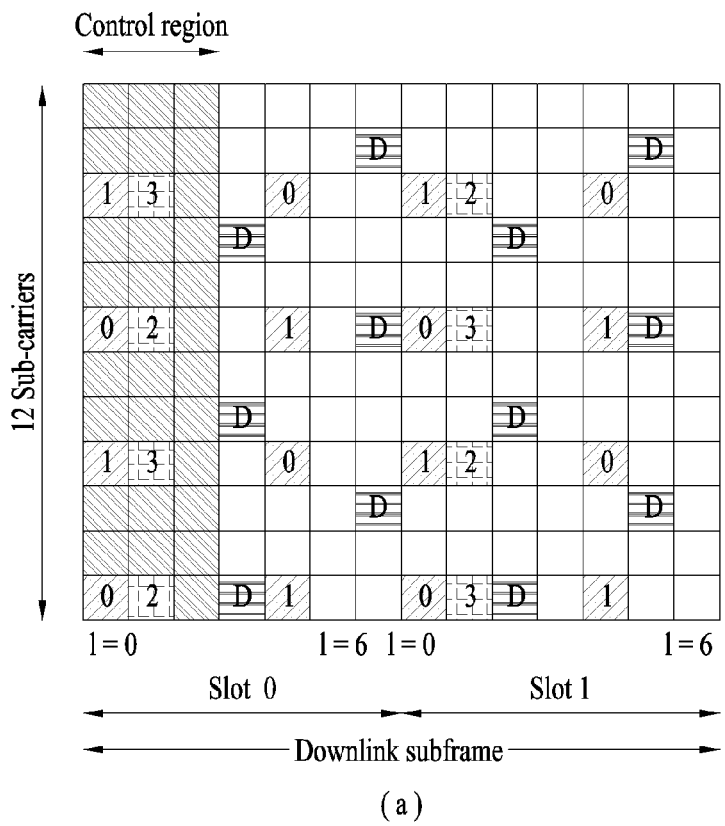
(a)
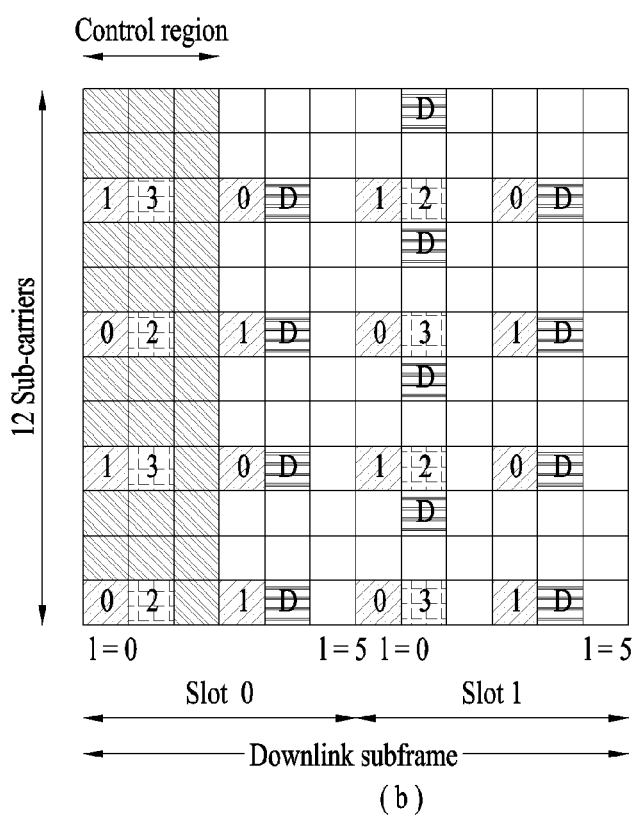
(b)

FIG. 21
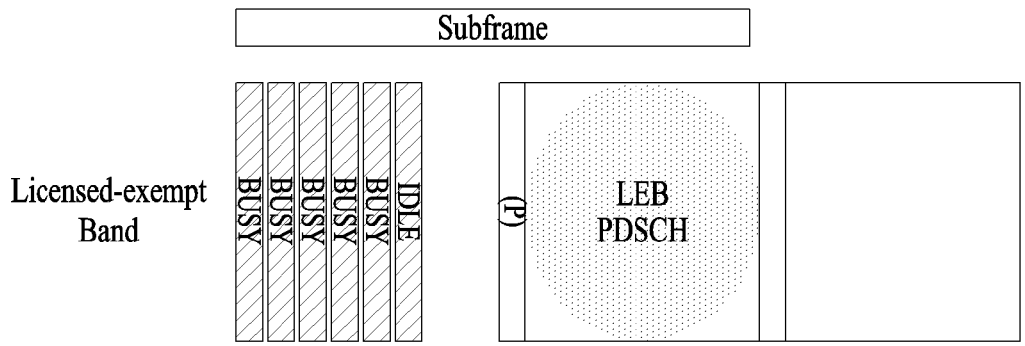
(a)
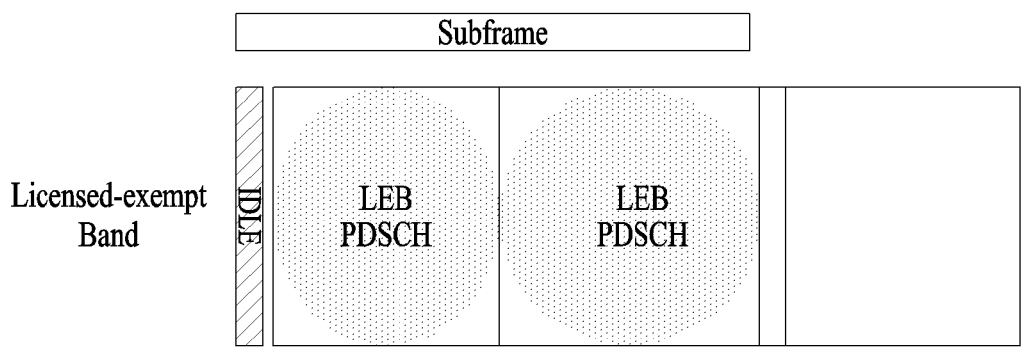
(b)

METHOD AND APPARATUS FOR TRANSMITTING A SIGNAL IN A WIRELESS COMMUNICATION SYSTEM

CROSS REFERENCE TO RELATED APPLICATIONS

This non-provisional application is a National Stage entry under U.S.C. §371 of International Application No. PCT/KR2012/005358 filed on Jul. 6, 2012, which claims the benefit of U.S. Provisional Application No. 61/505,508 filed on Jul. 7, 2011. The entire contents of all of the above applications are hereby incorporated by reference.

TECHNICAL FIELD

Following description relates to a method of transmitting a signal in a wireless communication system and an apparatus therefor.

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF THE INVENTION

Technical Task

The present invention relates to a method of transmitting a signal on an unlicensed band and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to a first technical solution of the present invention, a method of transmitting a signal on an unlicensed band, which is transmitted by an eNode B in a wireless communication system includes the steps of if the unlicensed band is identified as available via a carrier sensing, transmitting at least one of a preamble or a reservation signal and transmitting PDSCH on the unlicensed band immediately after at least one of the preamble or the reservation signal is transmitted, wherein the preamble is configured for a user equipment to acquire reception synchronization of at least one of the reservation signal or the PDSCH.

According to a second technical solution of the present invention, a method of receiving a signal on an unlicensed band, which is received by a user equipment in a wireless communication system includes the steps of receiving at least one of a preamble or a reservation signal from an eNode B on the unlicensed band and receiving PDSCH on the unlicensed band, wherein the user equipment acquires reception synchronization of at least one of the reservation signal or the PDSCH via the preamble.

According to a third technical solution of the present invention, an eNode B in a wireless communication system includes a transmission module and a processor, if un unlicensed band is identified as available via a carrier sensing, the processor configured to transmit at least one of a preamble or a reservation signal, the processor configured to transmit PDSCH on the unlicensed band immediately after at least one of the preamble or the reservation signal is transmitted, wherein the preamble is configured for a user equipment to acquire reception synchronization of at least one of the reservation signal or the PDSCH.

According to a fourth technical solution of the present invention, a user equipment in a wireless communication system includes a reception module and a processor, the processor configured to receive at least one of a preamble or a reservation signal from an eNode B on the unlicensed band, the processor configured to receive PDSCH on the unlicensed band, wherein reception synchronization of at least one of the reservation signal or the PDSCH is acquired via the preamble.

The first to the fourth technical solution of the present invention can include all or a part of the following description.

If the preamble is transmitted prior to the reservation signal, the preamble can include information for informing that transmission of the reservation signal starts.

If the preamble is transmitted after the reservation signal is transmitted, the preamble can be transmitted on a subframe boundary of a licensed band used by the eNode B.

If timing point on which the unlicensed band is identified as available corresponds to a prescribed one among a subframe boundary or a slot boundary of a licensed band used by the eNode B, the reservation signal may not be transmitted.

Scheduling information on the PDSCH transmitted on the unlicensed band can be transmitted via PDCCH transmitted on a licensed band used by the eNode B.

The preamble may further include identifier information of the user equipment receiving the PDSCH.

Advantageous Effects

According to the present invention, although a timing point of intending to transmit a signal on an unlicensed band is not matched with a timing point of which the unlicensed band is available, it is able to efficiently transmit a signal on the unlicensed band. And, a synchronization of a reservation signal, which is transmitted to secure a resource on an unlicensed band, and a synchronization of a data transmission can be precisely obtained.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 9 is a diagram for a PUCCH channel structure using block spreading;

FIG. 10 is a diagram for explaining a DL reference signal;

FIG. 19 to FIG. 21 is a diagram for explaining a PDSCH transmission on an unlicensed band according to an embodiment 2 of the present invention;

BEST MODE

Mode for Invention

Figure 1:
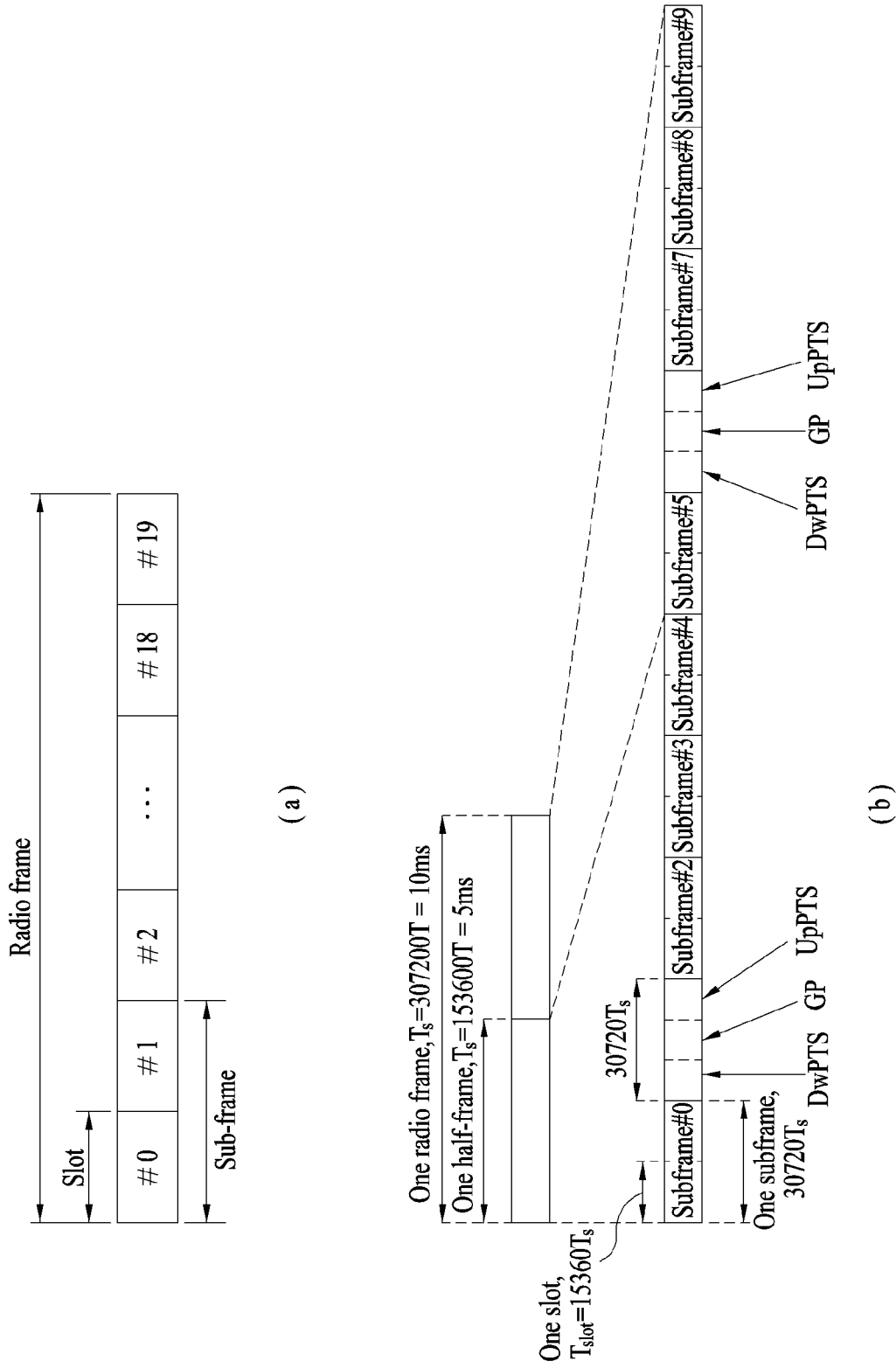
FIG. 1 is a diagram of a structure of a radio frame.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

FIG. 1 is a diagram of a structure of a radio frame. Referring to FIG. 1 (a), one radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain. Since 3GPP LTE system uses OFDMA in downlink, OFDM symbol is provided to indicate one symbol period. The OFDM symbol may be named SC-FDMA symbol or symbol period in uplink. Resource block (RB) is a resource allocation unit and may include a plurality of contiguous subcarriers in one slot. The above-described structures of the radio frame are exemplary only. Hence, the number of subframes included in a radio frame, the number of slots included in the subframe and the number of OFDM symbols included in the slot may be modified in various ways.

FIG. 1 (b) is a diagram for a structure of a radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in an eNode B and uplink transmission synchronization of a user equipment. The guard period is a period for eliminating interference generated in uplink due to multi-path delay of a downlink signal between uplink and downlink.

In this case, the structures of the radio frame are exemplary only. And, the number of subframes included in a radio frame, the number of slots included in the subframe and the number of symbols included in the slot may be modified in various ways.

Figure 2:
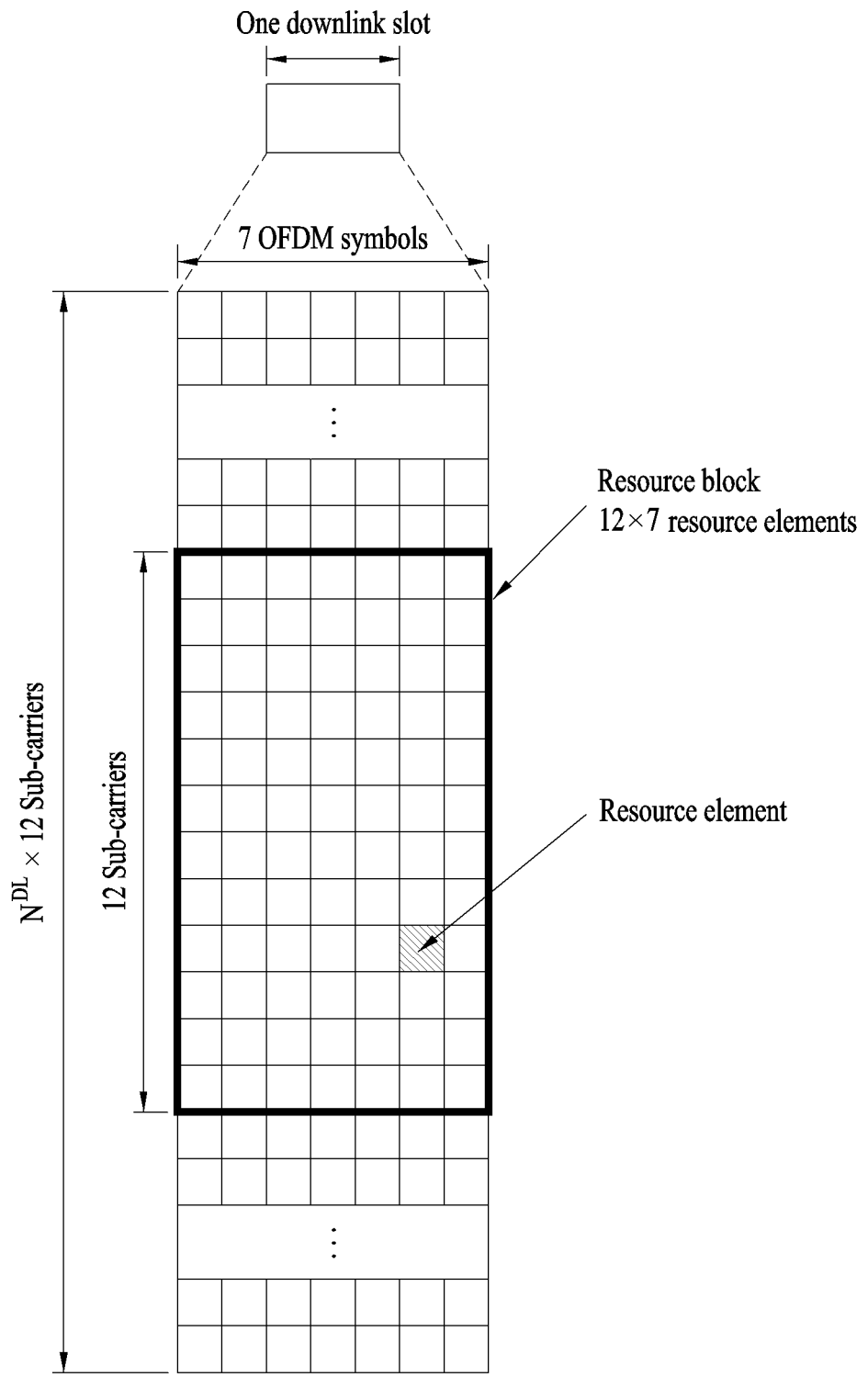
FIG. 2 is a diagram of a resource grid for a downlink (DL) slot.

FIG. 2 is a diagram of a resource grid for a downlink (DL) slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
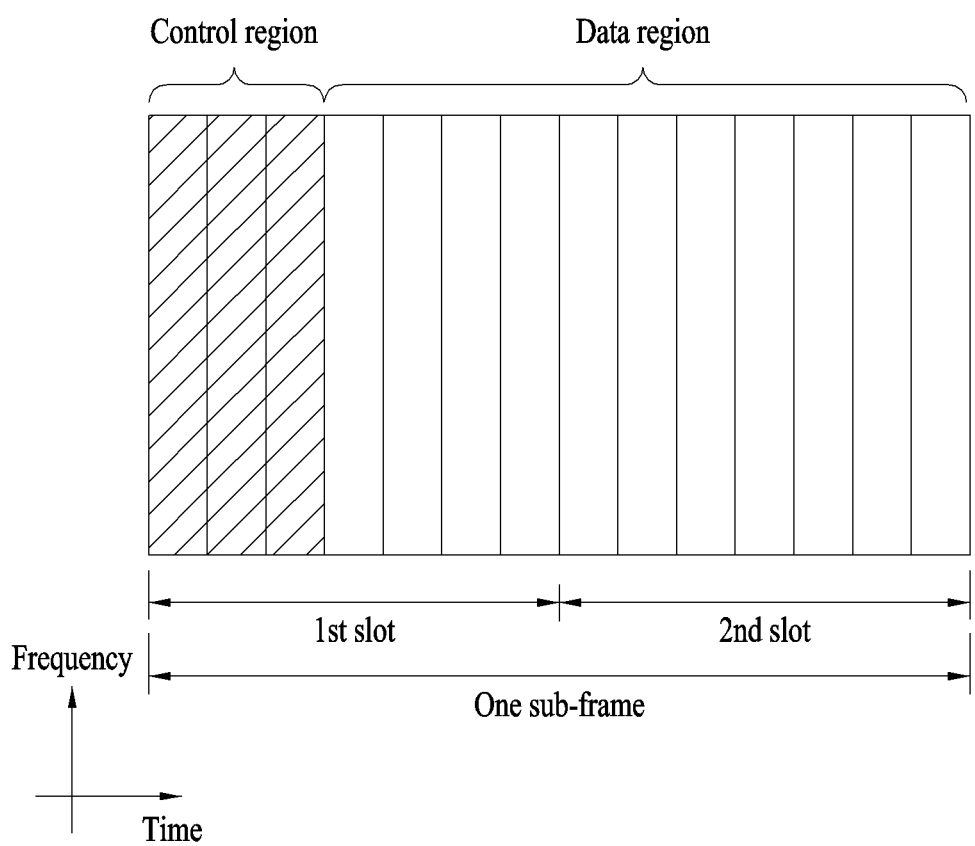
FIG. 3 is a diagram for a structure of a downlink (DL) subframe.

FIG. 3 is a diagram for a structure of a downlink (DL) subframe. Maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and includes information on the number of OFDM symbols used for a transmission of a control channel within the subframe.

The PHICH is a response channel in response to UL transmission and includes an ACK/NACK signal. The PDCCH transmits downlink control information (DCI). The DCI includes UL or DL scheduling information according to a format or may include a transmit power control command for a random user equipment group.

DCI Format

According to a current LTE-A (release 10), DCI format 0, 1, 1A, 1B, 1C, 1D, 2, 2A, 2B, 2C, 3, 3A, and 4 are defined. In this case, the DCI format 0, 1A, 3, and 3A are regulated to have an identical message size to reduce the numbers of blind decoding, which shall be described later. The DCI formats can be classified into i) DCI format 0 and 4 used for UL scheduling grant, ii) DCI format 1, 1A, 1B, 1C, 1D, 2, 2A, 2B, 2C used for DL scheduling assignment, and iii) DCI format 3 and 3A used for a power control command according to a usage of control information to be transmitted.

In case of the DCI format 0 used for UL scheduling grant, the DCI format 0 can include a carrier offset (carrier indicator) necessary in relation to a carrier aggregation, which is described later, an offset (flag for format 0/format 1A differentiation) used for distinguishing the DCI format 0 from the DCI format 1, a hopping flag (frequency hopping flag) informing of whether a frequency hopping is used in an UL PUSCH transmission, information on resource block assignment, which should be used by a UE to transmit PUSCH, a modulation and coding scheme, a new data offset (a new data indicator) used to empty a buffer for an initial transmission in relation to a HARQ process, a transmit power control command for PUSCH (TPC command for scheduled for PUSCH), cyclic shift information (cyclic shift for DM RS and OCC index) for DMRS (demodulation reference signal), an UL index necessary for performing a TDD operation, channel quality information (channel quality indicator) request information (CSI request), and the like. Meanwhile, since the DCI format 0 uses synchronous HARQ, the DCI format 0 does not include a redundancy version as like DCI formats related to DL scheduling assignment do. The carrier offset is not included in the DCI format if the cross carrier scheduling is not used.

The DCI format 4 is newly added to LTE-A release 10. The DCI format 4 is defined to support that a spatial multiplexing is applied to a UL transmission. Compared to the DCI format 0, since the DCI format 4 further includes informations for the spatial multiplexing, the DCI format 4 has a bigger message size and further includes additional control information in addition to the control information included in the DCI format 0. In particular, the DCI format 4 further includes a modulation and coding scheme for a second transmission block, precoding information for a multi antenna transmission, and sounding reference signal (SRS) request information. Meanwhile, since the DCI format 4 has a size greater than the DCI format 0, the DCI format 4 does not include an offset to distinguish the DCI format 0 from the DCI format 1A.

The DCI format 1, 1A, 1B, 1C, 1D, 2, 2A, 2B, 2C related to a DL scheduling assignment can be mainly divided into 1, 1A, 1B, 1C, and 1D not supporting a spatial multiplexing and 2, 2A, 2B, and 2C supporting the spatial multiplexing.

The DCI format 1C is used for a compact DL assignment and supports a frequency consecutive assignment only. Unlike the other formats, the DCI format 1C does not include a carrier offset and a redundancy version.

The DCI format 1A is a format used for a DL scheduling and a random access procedure. The DCI format 1A can include a carrier offset, an indicator indicating whether a DL distributed transmission is used, PDSCH resource allocation information, a modulation and coding scheme, a redundancy version, a HARQ processor number configured to inform of a processor used for a soft combining, a new data offset used to empty a buffer for an initial transmission in relation to a HARQ process, a transmit power control command for PUCCH, a UL index needed for a TDD operation, and the like.

In case of the DCI format 1, most of control information is similar to that of the DCI format 1A. Yet, while the DCI format 1A is related to a consecutive resource allocation, the DCI format 1 supports a non-consecutive resource allocation. Hence, since the DCI format 1 further includes a resource allocation header, a control signaling overhead may increase a little as a tradeoff for an increase of resource allocation flexibility.

When the DCI format 1B and 1D are compared with the DCI format 1, there exists something in common in that they further include precoding information. The DCI format 1B and the DCI format 1D include PMI confirmation and DL power offset information, respectively. The other control information included in the DCI format 1B and 1D is mostly matched with that of the DCI format 1A.

The DCI format 2, 2A, 2B, and 2C basically include most of the control informations included in the DCI format 1A and further include informations used for a spatial multiplexing. The informations used for the spatial multiplexing correspond to a modulation and coding scheme for a second transmission block, a new data offset, and a redundancy version.

The DCI format 2 supports a closed-loop spatial multiplexing and the DCI format 2A supports an open-loop spatial multiplexing. Both the DCI format 2 and the DCI format 2A include precoding information. The DCI format 2B supports a dual-layer spatial multiplexing combined with a beamforming and further includes cyclic shift information for a DMRS. The DCI format 2C can be understood as an extended version of the DCI format 2B and supports a spatial multiplexing up to eight layers.

The DCI format 3 and 3A can be used to supplement the transmit power control information, which is included in the aforementioned DCI formats configured to perform UL scheduling grant and DL scheduling assignment. In particular, the DCI format 3 and 3A can be used to support a semi-persistent scheduling. In case of the DCI format 3, a command of 1 bit-long is used per UE. In case of the DCI format 3A, a command of 2-bit long is used per UE.

Among the aforementioned DCI formats, a prescribed DCI format is transmitted on PDCCH and a plurality of PDCCHs can be transmitted within a control region. A UE can monitor a plurality of the PDCCHs.

PDCCH Processing

In transmitting a DCI on PDCCH, a cyclic redundancy check (CRC) is attached to the DCI. In this process, a radio network temporary identifier (RNTI) is masked. In this case, a different RNTI can be used according to a purpose of transmitting a DCI. Specifically, in case of a paging message related to a network initiation connection establishment, a P-RNTI can be used. An RA-RNTI can be used in case of a random access and an SI-RNTI can be used in case of a system information block (SIB). And, in case of a unicast transmission, a C-RNTI, which is a unique UE identifier, can be used. The DCI attached with a CRC is coded with a prescribed code and then is adjusted according to the quantity of resource used for a transmission via a rate-matching.

In case of transmitting the aforementioned PDCCH, a control channel element (CCE), which is a consecutive logical allocation unit, is used to efficiently process the transmission when the PDCCH is mapped to REs. The CCE consists of 36 REs and this corresponds to 9 sets of resource element group (REG). The number of CCEs used for a transmission of a specific PDCCH varies according to a DCI payload, which is a size of control information, a cell bandwidth, a channel coding rate, and the like. Specifically, the number of CCEs necessary for a specific PDCCH can be defined according to a PDCCH format as shown in a following Table 1.

TABLE 1

| PDCCH format | Number of CCEs | Number of resource element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 1, the number of CCEs varies according to a PDCCH format. For instance, while using a PDCCH format 0, if a channel state becomes worse, a transmitting side can change the PDCCH format to 2 to adaptively use the PDCCH format.

Blind Decoding

As mentioned in the foregoing description, PDCCH can be used by a prescribed one format among the four formats and the prescribed one format is not informed to a UE. Hence, in terms of the UE, the UE should perform a decoding while the PDCCH format is not known to the UE. This is called a blind decoding. Yet, since the decoding all available CCEs used for a DL according to each PDCCH format may become a big burden to the UE, a search space is defined in consideration of a limitation for a scheduler and the number of decoding attempt.

In particular, the search space is a set of candidate PDCCHs consisted of CCEs where the UE should perform a decoding attempt on an aggregation level. In this case, the aggregation level and the number of PDCCH candidate can be defined as Table 2 as follows.

TABLE 2

| | Search space | | Number of PDCCH candidate |
| --- | --- | --- | --- |
| | Aggregation level | Size (CCE) | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, since there exist 4 types of aggregation level, the UE may have a plurality of search spaces according to each of the aggregation levels.

Referring to Table 2, the search space can be divided into a UE-specific search space and a common search space. The UE-specific search space is configured for specific UEs. Each UE monitors (performing a decoding attempt on a set of PDCCH candidates according to an available DCI format) the UE-specific search space and checks whether an RNTI and a CRC masked on PDCCH is valid. If it is valid, the UE can obtain control information.

The common search space is configured for such a case that a plurality of UEs or all UEs need to receive PDCCH as a dynamic scheduling for system information, a paging message, or the like. Yet, the common search space can also be used for a specific UE in managing a resource. And, the common search space and the UE-specific search space may overlap with each other.

Figure 4:
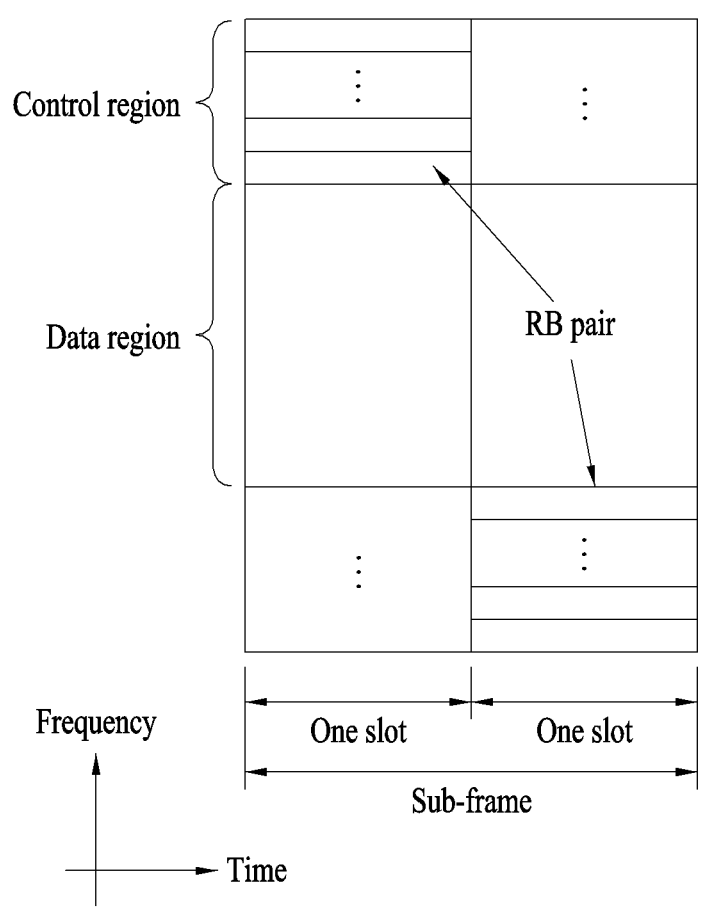
FIG. 4 is a diagram for a structure of an uplink (UL) subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is allocated to the control region. And, a physical UL shared channel (PUSCH), which includes user data, is allocated to the data region. In order to maintain single carrier property, one user equipment does not transmit PUCCH and PUSCH simultaneously. PUCCH for one user equipment is allocated to a resource block pair (RB pair) in subframe. Resource blocks belonging to the resource block (RB) pair may occupy different subcarriers in each of 2 slots. Namely, a resource block pair allocated to PUCCH is frequency-hopped on a slot boundary.

Physical Uplink Control Channel (PUCCH)

Uplink control information transmitted on PUCCH may include SR (Scheduling Request), HARQ ACK/NACK information, and DL channel measurement information.

The HARQ ACK/NACK information can be generated according to whether a decoding of a DL data packet on PDSCH is succeeded. In a legacy wireless communication system, 1 bit as the ACK/NACK information is transmitted for a DL single codeword transmission and 2 bits as the ACK/NACK information are transmitted for DL 2 codeword transmission.

The channel measurement information indicates feedback information related to a MIMO (Multiple Input Multiple Output) scheme and can include a channel quality indicator (CQI), a precoding matrix index (PMI), and a rank indicator (RI). The aforementioned channel measurement informations may be commonly called a CQI. 20 bits per subframe can be used to transmit the CQI.

PUCCH can be modulated using BPSK (binary phase shift keying) and QPSK (quadrature phase shift keying) scheme. Control information of a plurality of UEs can be transmitted on the PUCCH. In case of performing code division multiplexing (CDM) to distinguish a signal of each of the UEs, constant amplitude zero autocorrelation (CA-ZAC) sequence of length 12 is mainly used. Since the CAZAC sequence has a characteristic of maintaining constant amplitude in time domain and frequency domain, the CAZAC sequence has an appropriate property to increase coverage in a manner of lowering peak-to-average power ratio (PARR) or cubic metric (CM) of a UE. And, the ACK/NACK information on a DL data transmission transmitted on the PUCCH is covered using an orthogonal sequence or an orthogonal cover (OC).

And, the control information transmitted on the PUCCH can be distinguished using a cyclically shifted sequence including a cyclic shift (CS) value different from each other. The cyclically shifted sequence can be generated in a manner that a base sequence is cyclically shifted as much as a specific cyclic shift (CS) amount. The specific CS amount is indicated by a CS index. The number of available cyclic shift may vary according to a delay spread of a channel. Various types of sequences can be used as the base sequence and the aforementioned CAZAC sequence corresponds to one example of the base sequence.

And, the amount of control information capable of being transmitted by a UE in a subframe can be determined according to the number (i.e., SC-FDMA symbols except an SC-FDMA symbol used for transmitting a reference signal (RS) to detect coherent of the PUCCH) of SC-FDMA symbol available to transmit the control information.

PUCCH format 1 is used to solely transmit an SR. In case of solely transmitting the SR, a wave, which is not modulated, is applied. This shall be described in detail later.

PUCCH format 1a or 1b is used to transmit HARQ ACK/NACK. In case of solely transmitting the HARQ ACK/NACK in a random subframe, the PUCCH format 1a or 1b can be used. Or, the HARQ ACK/NACK and the SR may be transmitted in an identical subframe using the PUCCH format 1a or 1b.

PUCCH format 2 is used to transmit a CQI and PUCCH format 2a or 2b is used to transmit the CQI and the HARQ ACK/NACK. In case of an extended CP, the PUCCH format 2 may be used to transmit the CQI and the HARQ ACK/NACK.

Figure 5:
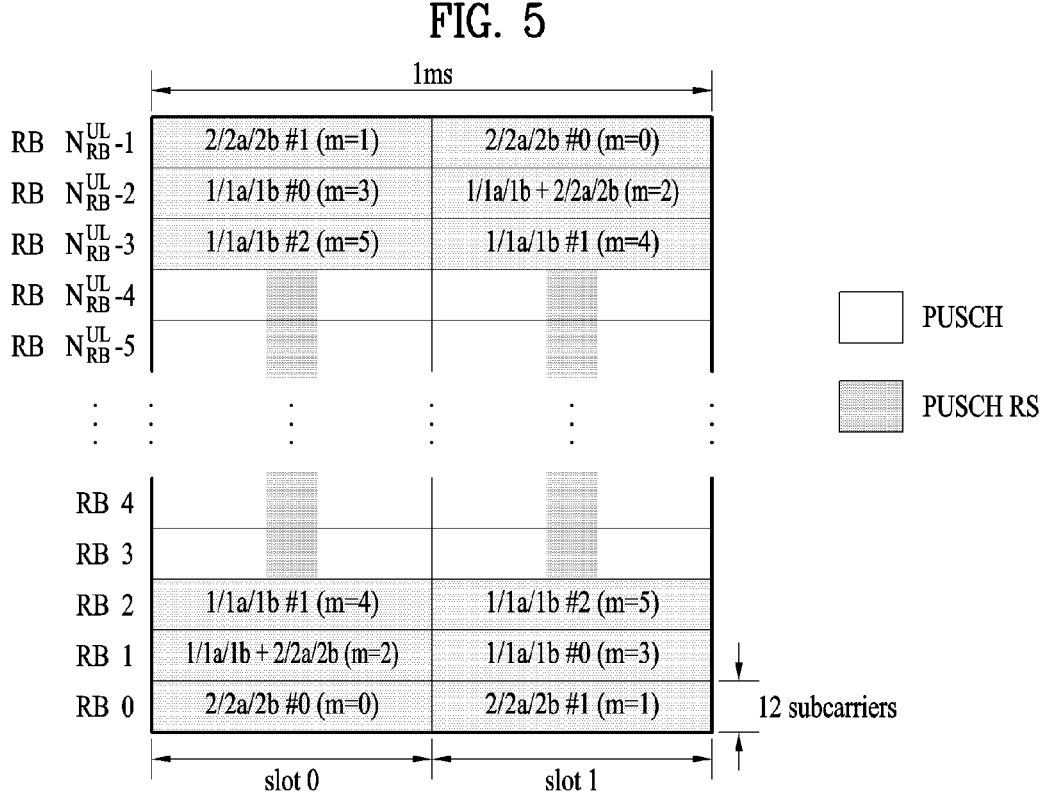
FIG. 5 is a diagram of a mapping form of PUCCH formats in an uplink physical resource block.

FIG. 5 is a diagram of a form that PUCCH formats map to PUCCH regions in an uplink physical resource block. Referring to FIG. 5, $N_{RB}^{UL}$ indicates the number of resource blocks in UL and 0, 1, . . . . $N_{RB}^{UL}-1$ means numbers of the physical resource block. Basically, PUCCH is mapped to both edges of a UL frequency block. As depicted in FIG. 5, PUCCH format 2/2a/2b are mapped to the PUCCH region displayed as m=0, 1. This may represent that the PUCCH format 2/2a/2b are mapped to resource blocks situated at a band-edge. And, the PUCCH format 2/2a/2b and PUCCH format 1/1a/1b can be mapped to a PUCCH region displayed as m=2 in a manner of being mixed. The PUCCH format 1/1a/1b can be mapped to a PUCCH region displayed as m+3, 4, 5. The number ($N_{RB}^{(2)}$) of PUCCH RBs usable by the PUCCH format 2/2a/2b can be directed to UEs in a cell by a broadcasting signaling.

PUCCH Resource

A base station (BS) assigns a PUCCH resource for transmitting uplink control information (UCI) to a UE by an explicit scheme via a higher layer signaling or an implicit scheme.

In case of ACK/NACK, a plurality of PUCCH resource candidates can be configured to a UE by a higher layer and which PUCCH resource is used among a plurality of the PUCCH resource candidates can be determined by the implicit scheme. For instance, the UE receives PDSCH from the BS and the ACK/NACK for a corresponding data unit can be transmitted via the PUCCH resource implicitly determined by PDCCH resource carrying scheduling information on the PDSCH.

Figure 6:
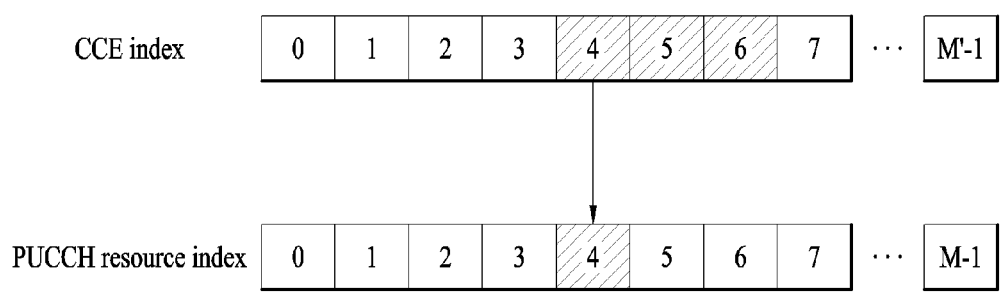
FIG. 6 is a diagram for an example of determining PUCCH resource for ACK/NACK.

FIG. 6 is a diagram for an example of determining PUCCH resource for ACK/NACK.

In LTE system, PUCCH resource for the ACK/NACK is not assigned to each UE in advance. Instead, a plurality of UEs in a cell uses a plurality of PUCCH resources on every timing point in a manner of dividing a plurality of the PUCCH resources. Specifically, the PUCCH resource used for transmitting the ACK/NACK by the UE is determined by an implicit scheme based on the PDCCH carrying scheduling information on PDSCH, which carries a corresponding DL data. A whole region to which the PDCCH is transmitted in each DL subframe consists of a plurality of control channel elements (CCE). And, the PDCCH transmitted to the UE consists of one or more CCEs. The CCE includes a plurality of REGs (resource element group). One REG consists of 4 adjacent REs (resource element) except a reference signal (RS). The UE transmits the ACK/NACK via an implicit resource derived or calculated by a function of a specific CCE index (e.g., a first or a lowest CCE index) among the indexes of CCEs for configuring the PDCCH received by the UE.

Referring to FIG. 6, each of the PUCCH resource indexes corresponds to the PUCCH resource for the ACK/NACK. If it is assumed that scheduling information on PDSCH is transmitted to a UE via PDCCH configured with $4^{th}$~6th CCE, the UE transmits the ACK/NACK to the BS via PUCCH, e.g., $4^{th}$ PUCCH, derived or calculated by the index of the $4^{th}$ CCE, which is the lowest CCE for configuring the PDCCH. FIG. 6 shows an example that maximum M' number of CCE exist in DL, and maximum M number of PUCCH exist in UL. Although the M' and the M may be identical to each other, it is also possible to design a value of the M' to be different from a value of the M. And, it is also possible to make mapping of the CCE overlap the mapping of the PUCCH resource.

For instance, the PUCCH resource index can be determined as follows.

$$n_{PUCCH}^{(1)} n_{CCE} + N_{PUCCH}^{(1)}$$ [Formula 1]

In this case, n(1)PUCCH indicates the PUCCH resource index to transmit the ACK/NACK and N(1)PUCCH indicates a signaling value delivered from a upper layer. The nCCE may indicate a smallest value among the CCE indexes used for PDCCH transmission. PUCCH is explained in more detail in the following description.

PUCCH Channel Structure

First of all, PUCCH format 1a and 1b are explained.

In the PUCCH format 1a/1b, a symbol modulated using the BPSK or QPSK modulation scheme is multiplied by a CAZAC sequence of length 12. For instance, a result of multiplying a modulated symbol d(0) by a CAZAC sequence r(n) of length N corresponds to y(0), y(1), y(2), . . . , y(N−1). The y(0), . . . , the y(N−1) symbols may be called a symbol block (block of symbol). After a modulated symbol is multiplied by a CAZAC sequence, a block-wise spreading using an orthogonal sequence is applied.

For normal ACK/NACK information, a Hadamard sequence of length 4 is used. For shortened ACK/NACK information and a reference signal, a Discrete Fourier Transform (DFT) sequence of length 3 is used. For a reference signal in case of an extended CP, a Hadamard sequence of length 2 is used.

Figure 7:
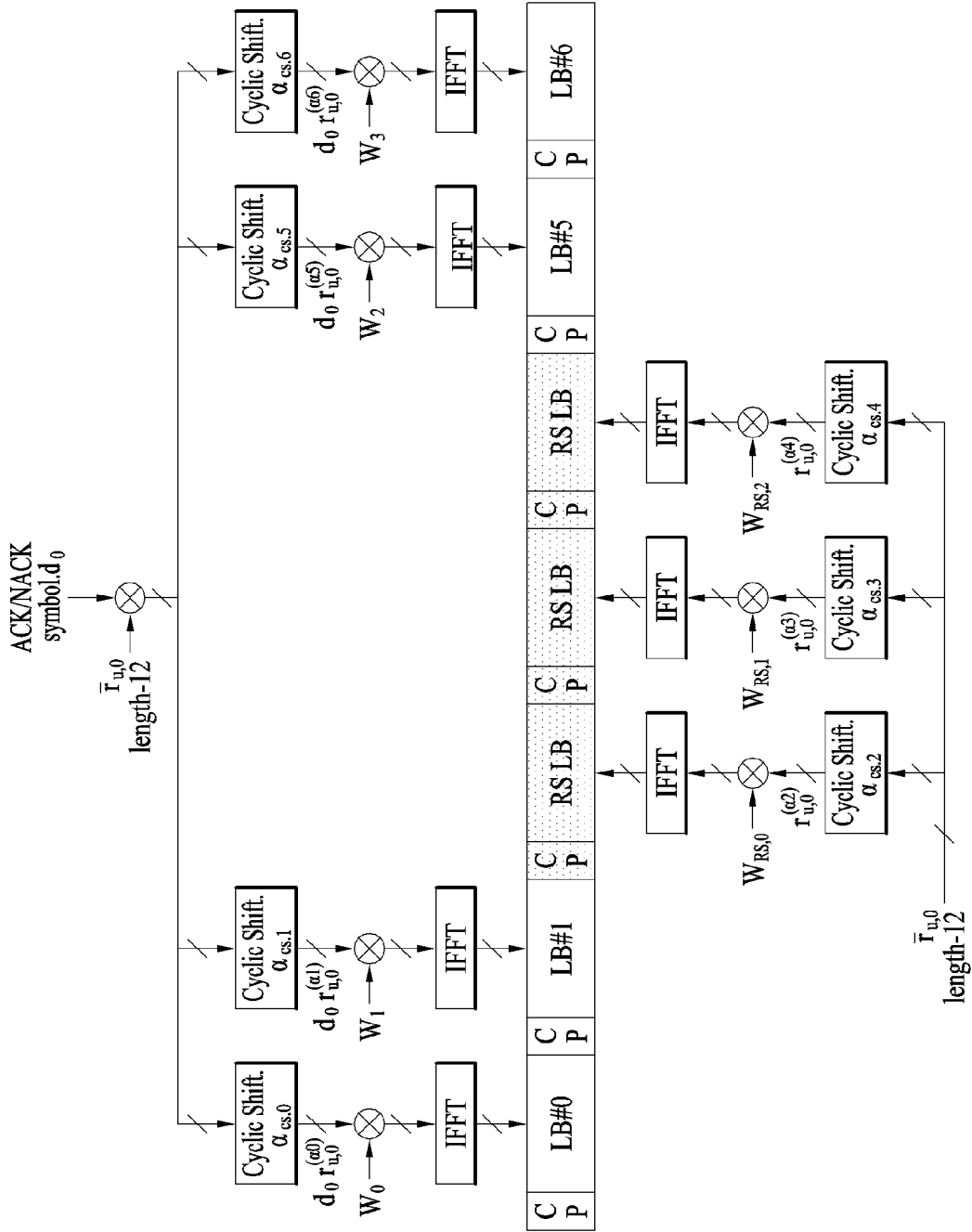
FIG. 7 is a diagram for a structure of an ACK/NACK channel in case of a normal CP.

FIG. 7 is a diagram for a structure of an ACK/NACK channel in case of a normal CP. A PUCCH channel structure to transmit HARQ ACK/NACK without a CQI is exemplified in FIG. 7. Among the 7 SC-FDMA symbols included in one slot, three consecutive SC-FDMA symbols in the middle part of the slot load a reference signal (RS) and the rest of 4 SC-FDMA symbols load an ACK/NACK signal. Meanwhile, in case of an extended CP, two consecutive symbols situated in the middle may load the RS. The number of symbol and the position of symbol used for the RS may vary according to a control channel. And, the number of symbol and the position of symbol used for the ACK/NACK signal may vary according to the control channel as well.

Confirmation response information (in a state of not scrambled) of 1 bit and 2 bits can be represented as one HARQ ACK/NACK modulated symbol using BPSK and QPSK modulation scheme, respectively. A positive confirmation response (ACK) can be encoded by '1' and a negative confirmation response (NACK) can be encoded by '0'.

When a control signal is transmitted in an assigned band, 2 dimensional spread is applied to increase a multiplexing capacity. In particular, frequency domain spread and time domain spread are simultaneously applied to increase the number of UE and the number of control channel capable of being multiplexed. In order to spread the ACK/NACK signal in frequency domain, a frequency domain sequence is used as a base sequence. As the frequency domain sequence, a Zadoff-Chu (ZC) sequence, which is one of the CAZAC sequence, can be used. For instance, by applying a cyclic shift (CS) different from each other to the ZC sequence, which is the base sequence, multiplexing of UEs different from each other or multiplexing of control channels different from each other can be applied. The number of CS resource, which is supported by a SC-FDMA symbol for PUCCH RBs, to transmit the HARQ ACK/NACK is configured by a cell-specific upper layer signaling parameter ($\Delta_{shift}^{PUCCH}$) and $\Delta_{shift}^{PUCCH} \in \{1, 2, 3\}$ indicates 12, 6, or 4 shift, respectively.

A frequency domain spread ACK/NACK signal is spread in time domain using an orthogonal spreading code. As the orthogonal spreading code, a Walsh-Hadamard sequence or a DFT sequence can be used. For instance, an ACK/NACK signal can be spread for 4 symbols using an orthogonal sequence (w0, w1, w2, w3) of length 4. And, an RS is spread using an orthogonal sequence of length 3 or length 2. This is called an orthogonal covering (OC).

As mentioned in the foregoing description, a plurality of UEs can be multiplexed by a code division multiplexing (CDM) scheme using a CS resource in frequency domain and an OC resource in time domain. In particular, the ACK/NACK information and the RS of a plurality of the UEs can be multiplexed on an identical PUCCH RB.

For the aforementioned time domain spread CDM, the number of spreading codes supporting the ACK/NACK information is restricted by the number of RS symbols. In particular, since the number of SC-FDMA symbols transmitting the RS is less than the number of SC-FDMA symbols transmitting the ACK/NACK information, multiplexing capacity of the RS is smaller than the multiplexing capacity of the ACK/NACK information. For instance, in case of a normal CP, the ACK/NACK information can be transmitted in four symbols. In this case, not four orthogonal spreading codes but three orthogonal spreading codes are used for the ACK/NACK information. This is because only three orthogonal spreading codes can be used for the RS, since the number of RS transmission symbol is restricted to three.

An example of the orthogonal sequence used for the spread of the ACK/NACK information is shown in Table 3 and Table 4. Table 3 indicates a sequence for a symbol of length 4 and Table 4 indicates a sequence for a symbol of length 3. The sequence for the symbol of length 4 is used in PUCCH format 1/1a/1b of a normal subframe configuration. In case of configuring a subframe, the sequence for the symbol of length 4 is applied in a first slot and a shortened PUCCH format 1/1a/1b of the sequence for a symbol of length 3 can be applied in a second slot in consideration of a case that a sounding reference signal (SRS) is transmitted in a last symbol of the second slot.

TABLE 3

| sequence index | {w(0), w(1), w(2), w(3)} |
| --- | --- |
| 0 | [+1 +1 +1 +1] |
| 1 | [+1 −1 +1 −1] |
| 2 | [+1 −1 −1 +1] |

TABLE 4

| sequence index | (0), w(1), w(2), w(3)} |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Meanwhile, an example of an orthogonal sequence used for RS spread of an ACK/NACK channel is shown in Table 5.

TABLE 5

| sequence index | normal CP | extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

In case that 3 symbols are used for RS transmission and 4 symbols are used for ACK/NACK information transmission in a subframe of a normal CP, for instance, if 6 cyclic shifts (CS) in frequency domain and 3 orthogonal cover (OC) resources in time domain are available, HARQ confirmation responses from a total 18 different UEs can be multiplexed in one PUCCH RB. In case that 2 symbols are used for RS transmission and 4 symbols are used for ACK/NACK information transmission in a subframe of an extended CP, for instance, if 6 cyclic shifts (CS) in frequency domain and 2 orthogonal cover (OC) resources in time domain are available, HARQ confirmation responses from a total 12 different UEs can be multiplexed in one PUCCH RB.

Subsequently, PUCCH format 1 is explained. A scheduling request (SR) is transmitted in a manner that a UE makes a request to be scheduled or the UE does not make a request to be scheduled. An SR channel reuses an ACK/NACK channel structure of a PUCCH format 1a/1b and is configured with an on-off keying (OOK) scheme based on an ACK/NACK channel design. A reference signal is not transmitted on the SR channel. Hence, a sequence of length 7 is used in case of a normal CP and a sequence of length 6 is used in case of an extended CP. A different cyclic shift or an orthogonal cover can be assigned to an SR and an ACK/NACK. In particular, a UE transmits a HARQ ACK/NACK via a resource allocated for an SR to transmit a positive SR. The UE transmits the HARQ ACK/NACK via a resource allocated for an ACK/NACK to transmit a negative SR.

Subsequently, PUCCH format 2/2a/2b is explained. The PUCCH format 2/2a/2b is a control channel to transmit a channel measurement feedback (CQI, PMI, RI).

A reporting cycle of the channel measurement feedback (hereinafter commonly called CQI information) and a frequency unit (or a frequency resolution), which becomes an object of measuring, can be controlled by an eNode B. A periodic and an aperiodic CQI report can be supported in time domain. A PUCCH format 2 is used for the periodic report only and PUSCH can be used for the aperiodic report. In case of the aperiodic report, an eNode B can direct a UE to transmit a scheduled resource in a manner of loading a separate CQI report on the scheduled resource to transmit a UL data.

Figure 8:
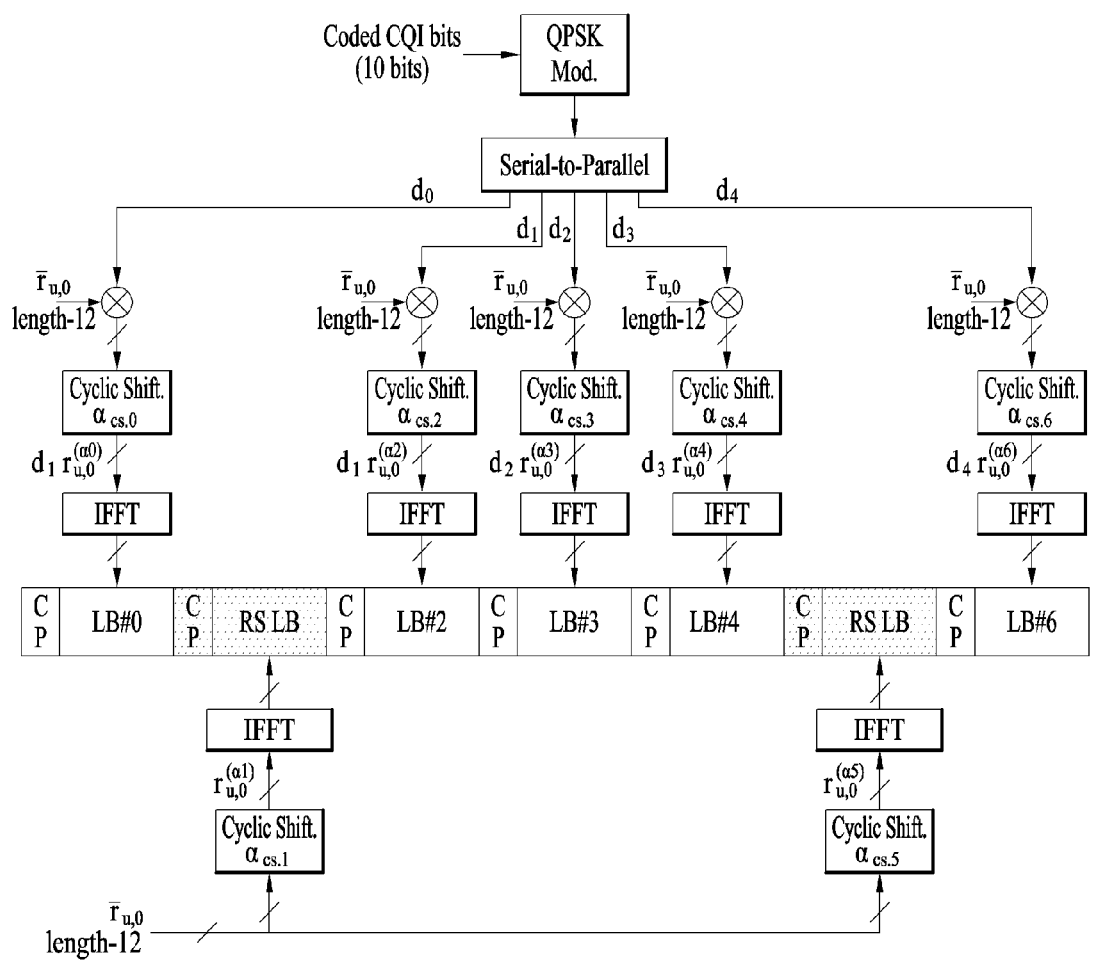
FIG. 8 is a diagram for a structure of a CQI channel in case of a normal CP.

FIG. 8 is a diagram for a structure of a CQI channel in case of a normal CP. Among FDMA symbol 0 to 6 in one slot, SC-FDMA symbol 1 and 5 (i.e., second and sixth symbol) are used to transmit a demodulation reference signal (DMRS) and the rest of the SC-FDMA symbols are used to transmit CQI information. Meanwhile, in case of an extended CP, one SC-FDMA symbol (i.e., SC-FDMA symbol 3) is used to transmit a DMRS.

PUCCH format 2/2a/2b supports a modulation performed by a CAZAC sequence and a symbol modulated by QPSK scheme is multiplied by a CAZAC sequence of length 12. A cyclic shift (CS) of a sequence is modified between a symbol and a slot. An orthogonal covering is used for a DMRS.

Among the 7 SC-FDMA symbols included in one slot, a reference signal (DMRS) is loaded on 2 SC-FDMA symbols apart from as much as a space of 3 SC-FDMA symbols and CQI information is loaded on the rest of the 5 SC-FDMA symbols. Using two RSs in one slot is to support a fast UE. And, each UE is distinguished using a cyclic shift (CS) sequence. CQI information symbols are delivered to all SC-FDMA symbols in a manner of being modulated and an SC-FDMA symbol is configured with one sequence. In particular, a UE transmits a CQI in a manner of modulating the CQI with each sequence.

The number of symbols capable of being transmitted in one TTI corresponds to 10 and a modulation scheme of CQI information is determined up to QPSK. In case of using QPSK mapping for an SC-FDMA symbol, since a CQI value of 2-bit can be loaded, the CQI value of 10-bit can be loaded in one slot. Hence, the CQI value of maximum 20 bits can be loaded in one subframe. A frequency domain spreading code is used to spread the CQI information in frequency domain.

A CAZAC sequence (e.g., a ZC sequence) of length-12 can be used as the frequency domain spreading code. Each control channel can be distinguished by applying the CAZAC sequence including a cyclic shift value different from each other. An IFFT is performed on the frequency domain spread CQI information.

12 different UEs can be orthogonally multiplexed in an identical PUCCH RB by a cyclic shift including 12 same intervals. In case of a normal CP, a DMRS sequence on the SC-FDMA symbol 1 and 5 (in case of an extended CP, SC-FDMA symbol 3) is similar to a CQI signal sequence in frequency domain. Yet, a modulation applied to the CQI information is not applied to the DMRS sequence. A UE can be semi-statically configured by an upper layer signaling to periodically report different types of CQI, PMI and RI on a PUCCH resource indicated by a PUCCH resource index ($n_{PUCCH}^{(2)}$). In this case, the PUCCH resource index ($n_{PUCCH}^{(2)}$) is information to indicate a PUCCH region used for PUCCH format 2/2a/2b transmission and a cyclic shift (CS) value to be used.

Subsequently, an enhanced-PUCCH (e-PUCCH) format is explained. The e-PDCCH may correspond to a PUCCH format 3 of LTE-A system. A block spreading scheme can be applied to an ACK/NACK transmission using the PUCCH format 3.

Unlike a legacy PUCCH format 1 series or 2 series, the block spreading scheme is a scheme for modulating a control signal transmission using an SC-FDMA scheme. As shown in FIG. 9, a symbol sequence can be transmitted in time domain in a manner of being spread using an orthogonal cover code (OCC). By using the OCC, control signals of a plurality of UEs in an identical RB can be multiplexed. In case of the aforementioned PUCCH format 2, one symbol sequence is transmitted in a manner of being spanned in time domain and the control signals of a plurality of the UEs are multiplexed using the CS (cyclic shift) of the CAZAC sequence. On the other hand, in case of the block spreading-based PUCCH format (e.g., PUCCH format 3), one symbol sequence is transmitted in a manner of being spanned in frequency domain and the control signals of a plurality of the UEs are multiplexed by using time domain spreading using the OCC.

FIG. 9 (a) indicates an example that 4 SC-FDMA symbols (i.e., data part) are generated using an OCC of length 4 (or a spreading factor (SF)=4) in one symbol sequence and are transmitted in one slot. In this case, 3 RS symbols (i.e., RS part) can be used in one slot.

FIG. 9 (b) indicates an example that 5 SC-FDMA symbols (i.e., data part) are generated using an OCC of length 5 (or a spreading factor (SF)=5) in one symbol sequence and are transmitted in one slot. In this case, 2 RS symbols can be used in one slot.

Referring to the example of FIG. 9, the RS symbol can be generated from a CAZAC sequence to which a specific cyclic shift value is applied and can be transmitted in a form that a prescribed OCC is applied (or multiplied) to a plurality of RS symbols. And, in the example of FIG. 9, if it is assumed that 12 modulation symbols are used according to each OFDM symbol (or SC-FDMA symbol) and each modulation symbol is generated by QPSK scheme, maximum bit number capable of being transmitted in one slot becomes 12*2=24 bits. Hence, the bit number capable of being transmitted by 2 slots becomes a total 48 bits. As mentioned earlier, in case of using the PUCCH channel structure of the block spreading scheme, it enables to transmit control information of an extended size compared to a legacy PDCCH format 1 series and 2 series.

Reference Signal (RS)

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both a transmitting end and the receiving end is transmitted and finds out the channel information with the extent of distortion when the signal is received on a channel. The signal is called a pilot signal or a reference signal.

When a data is transmitted/received using MIMO antenna, it may be preferable that a channel state between a transmitting antenna and a receiving antenna is detected in order for a receiving end to correctly receive the data. Hence, in order for the receiving end to detect the channel state, each transmitting antenna of the transmitting end may preferably have an individual reference signal.

DL reference signals are classified into a common reference signal (CRS) shared by all user equipments in one cell and a dedicated reference signal (DRS) for a specific user equipment only. The information necessary for a channel estimation and demodulation can be provided by the aforementioned reference signals.

The receiving end (e.g., a user equipment) estimates a channel state using the CRS and may be then able to feedback such an indicator related to a channel quality as a channel quality indicator (CQI), a precoding matrix index (PMI) and/or a rank indicator (RI) to the transmitting end (e.g. an eNode B) in response to the estimated channel state. CRS may be named a cell-specific reference signal (cell-specific RS). On the other hand, a reference signal related to a feedback of such channel state information (CSI) as CQI/PMI/RI may be separately defined as CSI-RS.

Meanwhile, DRS can be transmitted to user equipments via resource elements if data demodulation on PDSCH is required. A user equipment can be indicated by an upper layer on whether a DRS exists. The UE can be indicated that the DRS is effective only when a corresponding PDSCH is mapped to the DRS. The DRS may be called a UE-specific reference signal or a demodulation reference signal (DMRS).

FIG. 10 is a diagram of a pattern to which CRS and DRS defined by 3GPP LTE system (e.g., release-8) are mapped to DL resource block pair (RB pair). The DL resource block pair as a unit to which a reference signal is mapped can be represented as a unit of 'one subframe in time domain×12 subcarriers in frequency domain'. In particular, one resource block pair has 14 OFDM symbols in length in case of a normal CP and 12 OFDM symbols in length in case of an extended CP (FIG. 10 (b)) in time domain.

FIG. 10 indicates a position of a reference signal in a resource block pair in a system where an eNode B supports 4 transmission antennas. Resource elements (RE) represented as '0', '1', '2', and '3' in FIG. 10 indicates a position of a CRS for antenna ports 0, 1, 2, and 3, respectively. Meanwhile, the resource element represented as 'D' in FIG. 10 indicates a position of a DRS.

Sounding Reference Signal (SRS)

A sounding reference signal (SRS) is mainly used for an eNode B to perform a frequency-selective scheduling in UL in a manner of measuring a channel quality and the SRS is not related to a UL data and/or a control information transmission. Yet, this is just exemplary. The SRS can also be used to enhance power control or to support various start-up functions of UEs, which are not recently scheduled. For instance, the start-up function may include an initial modulation and coding scheme (MCS), an initial power control to transmit a data, timing alignment, frequency-semi selective scheduling (a frequency resource is selectively allocated in a first slot in a subframe and a frequency resource is pseudo-randomly hopped to a different frequency in a second slot), and the like.

And, the SRS can be used for a channel quality measurement under an assumption that a radio channel is reciprocal between UL and DL. The assumption is specifically effective in a time division duplex (TDD) system that the UL and the DL share an identical frequency band and are distinguished from each other in time domain.

A subframe to which an SRS is transmitted by a random UE in a cell is indicated by a cell-specific broadcast signaling. A cell-specific parameter of 4-bit 'SrsSubframeConfiguration' indicates 15 available configurations of a subframe to which an SRS is capable of being transmitted in each radio frame. By the help of the configurations, flexibility capable of controlling an SRS overhead can be provided according to a network arrangement scenario. The configuration of a last one ($16^{th}$) of the parameter corresponds to completely switching-off of an SRS transmission in a cell. For instance, the switching-off configuration may be suitable for a cell for serving a fast UEs.

Figure 11:
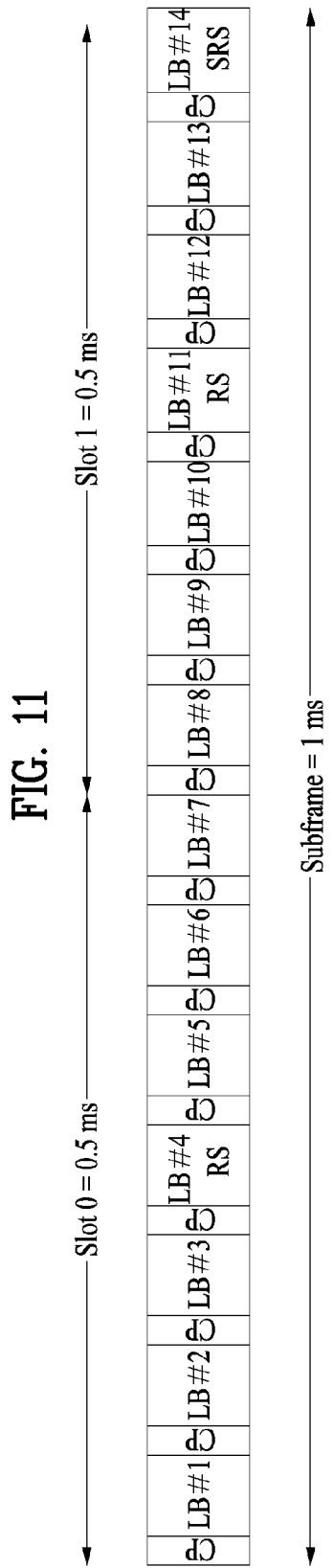
FIG. 11 is a diagram for explaining a sounding reference signal.

As depicted in FIG. 11, an SRS is always transmitted in a last SC-FDMA symbol of a configured subframe. Hence, the SRS and a demodulation reference signal (DMRS) are positioned at a SC-FDMA symbol different from each other. PUSCH data transmission is not allowed in the SC-FDMA symbol designated to transmit an SRS. Hence, in case that a sounding overhead is severest (i.e., in case that the SRS transmission symbol exists in all subframes), the sounding overhead is not over about 7%.

Each of the SRS symbols is generated by a base sequence (a random sequence or a ZC (Zadoff-Chu)-based sequence set) in a given time unit and a frequency band and all UEs in a cell use an identical base sequence. In this case, SRS transmissions from a plurality of UEs in a cell in an identical time unit and an identical frequency band are orthogonally distinguished by a different cyclic shift of the base sequence assigned to a plurality of the UEs. An SRS sequence of a different cell can be distinguished by assigning a different base sequence to each cell. Yet, orthogonality between different base sequences is not secured.

Relay

A relay extends service coverage of an eNode B or facilitates a service of the eNode B in a manner of being installed in a radio shadow area. A UE performs a communication with an eNode B or a relay. The UE performing a communication with the eNode B is called a macro UE and the UE performing a communication with the relay is called a relay UE. A communication link between the eNode B and the macro UE is called a macro access link and a communication link between the relay and the relay UE is called a relay access link. And, a communication link between the eNode B and the relay is called a backhaul link.

A relay can be classified into an L1 (layer 1) relay, an L2 (layer 2) relay, and an L3 (layer 3) relay according to how much functions are performed by the relay in a multi hop transmission. And, the relay can be classified into an in-band connection of which a network-relay link and a network-UE link share an identical frequency band in a donor cell and an out-band connection of which the network-relay link and the network-UE link use a frequency band different from each other in a donor cell according to a network link. And, the relay may be divided into a transparent relay of which a UE does not know that the UE performs a communication via a relay and a non-transparent relay of which a UE knows that the UE performs a communication via a relay. In terms of mobility, a relay can be classified into a fixed relay capable of being used for a radio shadow area or increase of cell coverage, a nomadic relay capable of being temporarily installed or randomly moved in case that users are rapidly increased, and a mobile relay capable of being installed in such a public transportation as a bus, a train, or the like.

Figure 12:
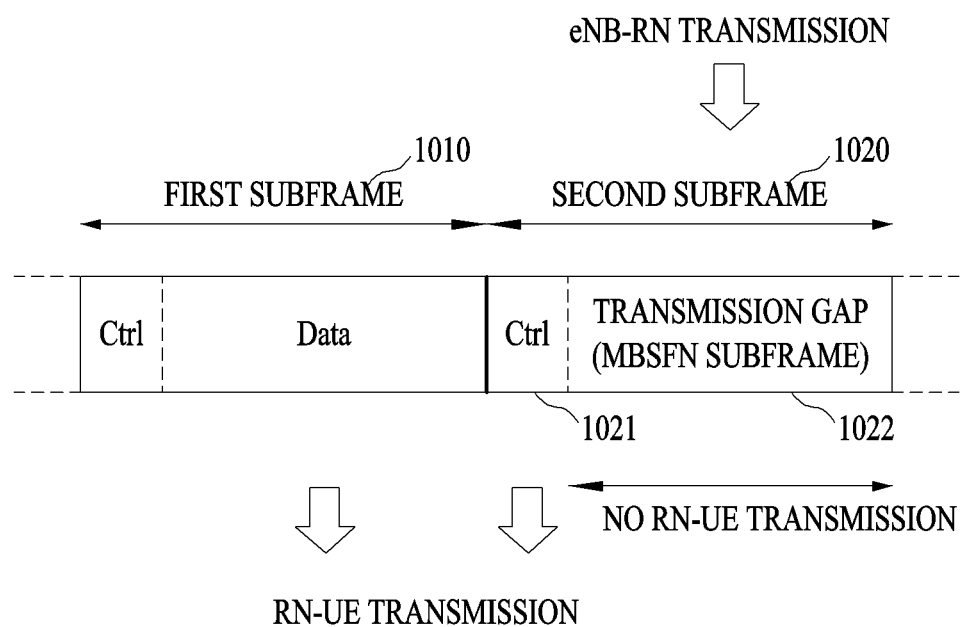
FIG. 12 is a diagram for explaining a resource partitioning for a relay.

FIG. 12 indicates an example of performing a backhaul transmission using an MBSFN subframe. In an in-band relay mode, an eNode B-relay link (i.e., backhaul link) and a relay-UE link (i.e., relay access link) operate on an identical frequency band. In case that a relay receives a signal from an eNode B and then transmits the signal to a UE, and vice versa, since a transmitter and a receiver of the relay cause interference to each other, it may be restricted for the relay to transmit and receive a signal at the same time. To this end, the backhaul link and the relay access link are partitioned by a TDM scheme. In order to support measuring operation of a legacy UE existing in a relay zone, LTE-A sets a backhaul link in an MBSFN subframe (fake MBSFN method). In case that a random subframe is signaled as the MBSFN subframe, since a UE receives a control region of the corresponding subframe only, a relay can configures the backhaul link using a data region of the corresponding subframe.

Carrier Aggregation

Figure 13:
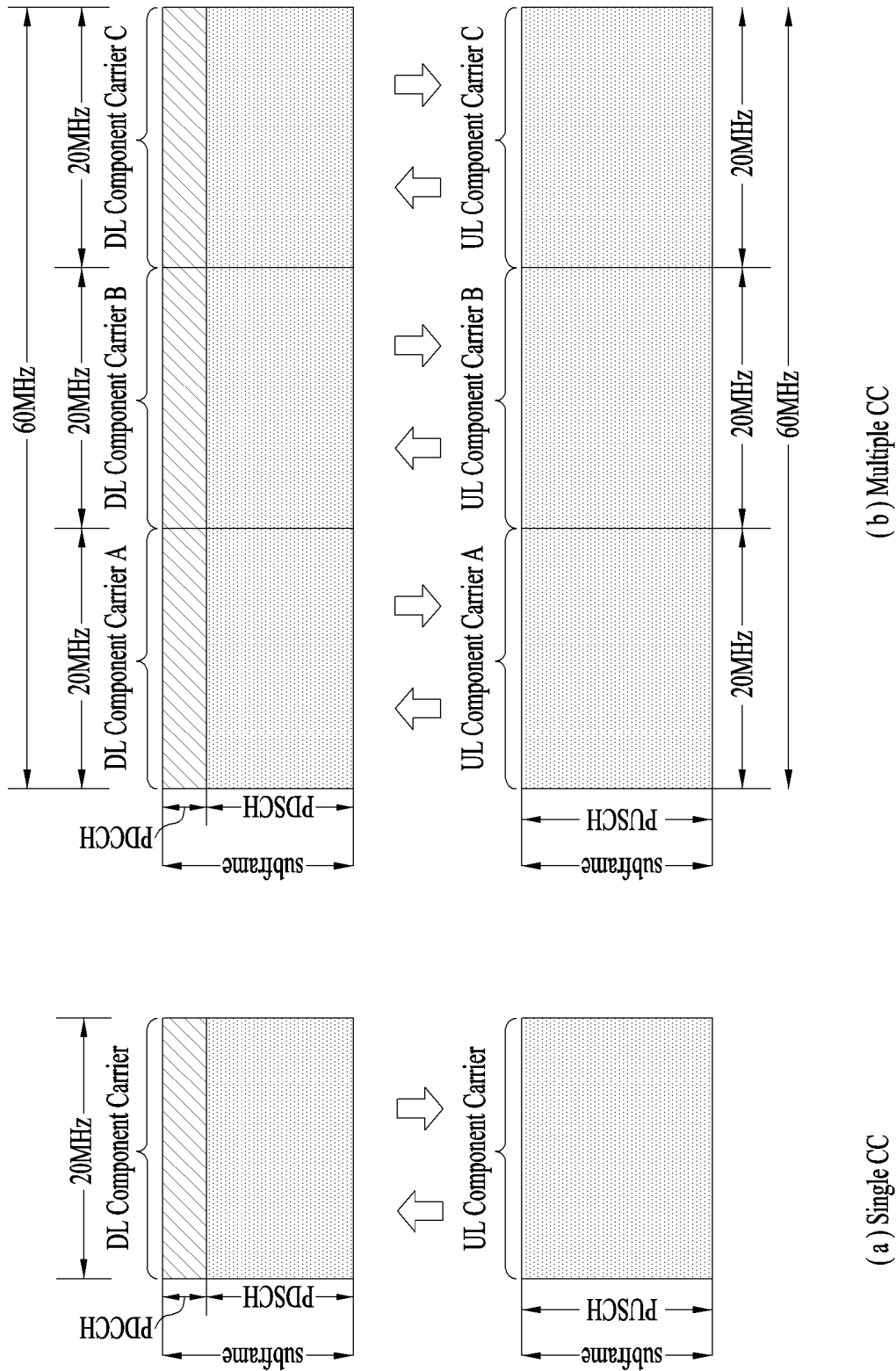
FIG. 13 is a diagram for explaining a carrier aggregation.

FIG. 13 is a diagram for explaining a carrier aggregation. Prior to explaining the carrier aggregation, a concept of a cell introduced to manage a radio resource in LTE-A is explained first. A cell can be understood as a combination of a DL resource and a UL resource. In this case, the UL resource is not an essential element. Hence, a cell can consist of the DL resource only or both the DL resource and the UL resource. Yet, this is the definition of a current LTE-A release 10 and an opposite case, i.e., a cell consisted of the UL resource only is also possible. The DL resource may be called a downlink component carrier (DL CC) and the UL resource may be called an uplink component carrier (UL CC). The UL CC and the DL CC can be represented by a carrier frequency. The carrier frequency means a center frequency of a corresponding cell.

A cell can be classified into a primary cell (PCell) operating on a primary frequency and a secondary cell (SCell) operating on a secondary frequency. The PCell and the Scell can be commonly called a serving cell. A cell indicated by a UE in a process of performing an initial connection establishment, a connection re-establishment, or a handover can become the PCell. In particular, The PCell may mean the cell becoming a center of a control related communication in a carrier aggregation environment. In particular, a UE is able to perform a transmission by receiving assignment of PUCCH in its PCell. The SCell is configurable only after an RRC connection has been established. And, the SCell may be usable to provide an addition radio resource. The rest of the serving cells except the PCell may correspond to the Scell in the carrier aggregation environment. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells. After an initial security activating process has started, a network may be able to configure at least one SCell in addition to PCell configured in the early stage of a connection establishment process for the UE supporting carrier aggregation.

In the following description, carrier aggregation is explained with reference to FIG. 13. The carrier aggregation is a technique introduced to enable a user to use a wider band to meet a request for a higher fast throughput. The carrier aggregation can be defined as an aggregation of two or more component carriers (CCs) including a carrier frequency different from each other. Referring to FIG. 13, FIG. 13 (a) indicates a subframe using one CC in a legacy LTE system and FIG. 13 (b) indicates a subframe to which a carrier aggregation is applied. FIG. 13 (b) depicts an example that the subframe supports a bandwidth of total 60 MHz in a manner of using three CCs of 20 MHz. In this case, each CC can be configured to be contiguous or non-contiguous.

A UE can simultaneously receive and monitor a UL data via a plurality of DL CCs. A linkage between a DL CC and a UL CC may be indicated by system information. DL CC/UL CC link can be configured to be fixed in a system or semi-statically. And, although a system total band is configured with N number of CCs, a frequency band capable of being monitored/received by a specific UE may be limited to M (<N) number of CCs. Various parameters for the carrier aggregation can be configured cell-specifically, UE group-specifically, or UE-specifically.

Figure 14:
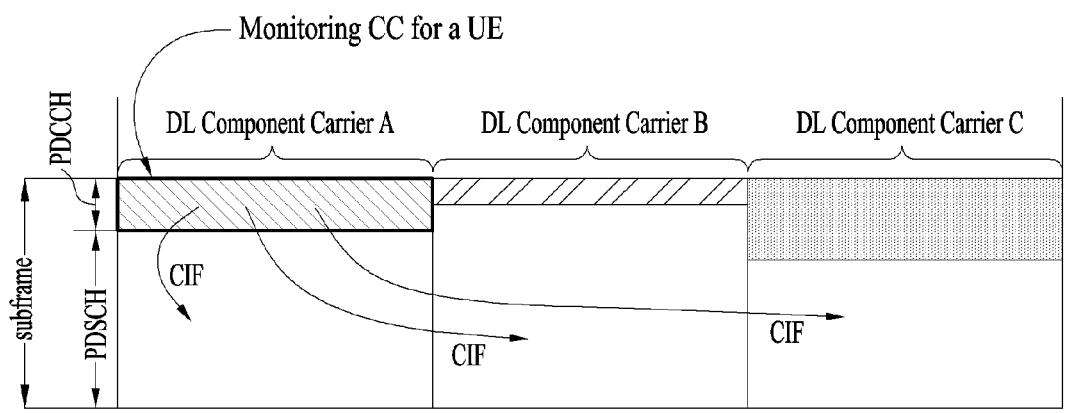
FIG. 14 is a diagram for explaining a cross carrier scheduling.

FIG. 14 is a diagram for explaining a cross carrier scheduling. For instance, the cross carrier scheduling means to include all of DL scheduling assignment information of a different DL CC into a control region of a prescribed DL CC among a plurality of serving cells. Or, the cross carrier scheduling means to include all UL scheduling grant information on a plurality of UL CCs, which are linked to a prescribed DL CC among a plurality of serving cells, into a control region of the prescribed DL CC.

First of all, a carrier indicator field (CIF) is explained.

As mentioned earlier, the CIF may be included in a DCI format transmitted on PDCCH or not included in the DCI format transmitted on PDCCH. If the CIF is included in the DCI format, it indicates that the cross carrier scheduling is applied. In case that the cross carrier scheduling is not applied, DL scheduling assignment information is valid on a DL CC on which the DL scheduling assignment information is currently transmitted. And, an UL scheduling grant is valid for one UL CC linked to the DL CC on which a DL scheduling assignment information is transmitted.

In case that the cross carrier scheduling is applied, a CIF indicates a CC related to the DL scheduling assignment information, which is transmitted on PDCCH in a prescribed one DL CC. For instance, referring to FIG. 14, DL assignment information for DL CC B and DL CC C, i.e., information on PDSCH resource is transmitted on PDCCH situated in the control region of DL CC A. A UE may be aware of the resource region of PDSCH and a corresponding CC via the CIF in a manner of monitoring the DL CC A.

Whether a CIF is included in PDCCH or not can be semi-statically configured and can be UE-specifically enabled by an upper layer signaling. In case that a CIF is disabled, PDCCH on a specific DL CC allocates PDSCH resource situated on an identical DL CC and may be able to allocate PUSCH resource situated on UL CC linked to the specific DL CC. In this case, a coding scheme identical to a legacy PDCCH structure, CCE-based resource mapping, DCI format, and the like can be applied.

Meanwhile, in case that a CIF is enabled, PDCCH on a specific DL CC can allocate PDSCH/PUSCH resource on one DL/UL CC indicated by the CIF among a plurality of aggregated CCs. In this case, the CIF can be additionally defined in a legacy PDCCH DCI format. The CIF is defined by a fixed field of 3 bit-long or can be fixed irrespective of a DCI format size. In this case, a coding scheme identical to a legacy PDCCH structure, CCE-based resource mapping, DCI format, and the like can be applied as well.

In case that a CIF exists, an eNode B can assign a set of DL CCs to monitor PDCCH. By doing so, a burden of blind decoding of a UE can be reduced. The set of DL CCs monitoring PDCCH is a part of a total aggregated DL CC and the UE can perform PDCCH detection/decoding on the corresponding set of DL CCs only. In particular, in order to schedule PDSCH/PUSCH for the UE, the eNode B can transmit PDCCH on the set of DL CCs for monitoring PDCCH only. The set of DL CCs for monitoring PDCCH can be configured UE-specifically, UE group-specifically, or cell-specifically. For instance, as depicted in the example of FIG. 14, in case that 3 DL CCs are aggregated, DL CC A can be configured as the DL CC for monitoring PDCCH. In case that a CIF is disabled, PDCCH on each of the DL CCs can schedule PDSCH on the DL CC A only. Meanwhile, if the CIF is enabled, PDCCH on the DL CC A can schedule not only PDSCH on the DL CC A but also PDSCH on a different DL CC. In case that the DL CC A is configured as the DL CC for monitoring PDCCH, PDSCH is not transmitted to the DL CC B and the DL CC C.

In a system to which the aforementioned carrier aggregation is applied, a UE can receive a plurality of PDSCHs on a plurality of DL carriers. In this case, there may exist a case that the UE transmits ACK/NACK for each data on a single UL CC in one subframe. In case of transmitting a plurality of ACK/NACK in one subframe using PUCCH format 1a/1b, higher transmit power is required, PAPR of a UL transmission is increased, and a distance capable of being transmitted by the UE to an eNode B may be decreased due to an inefficient use of a transmit power amplifier. ACK/NACK bundling or ACK/NACK multiplexing can be applied to transmit a plurality of the ACK/NACK on one PUCCH.

And, there may exist a case that ACK/NACK information on a plurality of DL data resulted from an application of carrier aggregation and/or ACK/NACK information on a plurality of DL data transmitted from a plurality of DL subframes in a TDD system should be transmitted on PUCCH in one subframe. In this case, if the number of ACK/NACK bits to be transmitted is greater than the number of bits capable of being supported by the ACK/NACK bundling or the ACK/NACK multiplexing, the ACK/NACK information cannot be properly transmitted by the aforementioned schemes.

ACK/NACK Multiplexing Scheme

In case of ACK/NACK multiplexing, ACK/NACK response contents on a plurality of data units can be identified by a combination of an ACK/NACK unit used for practically transmitting an ACK/NACK and symbols modulated by QPSK scheme. For instance, assume that one ACK/NACK unit carries information of 2-bit long and receives maximum 2 data units. In this case, assume that HARQ confirmation response for each of the received data units is represented by one ACK/NACK bit. In this case, a transmitting end, which has transmitted a data, can identify an ACK/NACK result as shown in a following Table 6.

TABLE 6

| HARQ-ACK(0), HARQ-ACK(0) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

Referring to Table 6, HARQ-ACK(i) (i=0, 1) indicates the ACK/NACK result for a data unit i. As mentioned earlier, since it is assumed that the maximum 2 data units (data unit 0 and data unit 1) are received, ACK/NACK result for the data unit 0 is represented as HARQ-ACK(0) and the ACK/NACK result for the data unit 1 is represented as HARQ-ACK(1) in the Table 6. In the Table 6, discontinuous transmission (DTX) indicates that a data unit corresponding to the HARQ-ACK(i) is not transmitted or a receiving end cannot detect a presence of a data unit corresponding to the HARQ-ACK(i). And, $n_{PUCCH,x}^{(1)}$ indicates an ACK/NACK unit practically used for an ACK/NACK transmission. In case that maximum 2 ACK/NACK units exist, the ACK/NACK unit can be represented as $n_{PUCCH,0}^{(1)}$ and $n_{PUCCH,1}^{(1)}$. And, b(0) and b(1) indicate two bits transmitted by a selected ACK/NACK unit. A modulation symbol transmitted by the ACK/NACK unit is determined according to the b(0) and the b(1) bit.

For instance, in case that a receiving end successfully receives and decodes 2 data units (i.e., in case of ACK, ACK in the Table 6), the receiving end transmits two bits (1, 1) using the ACK/NACK unit $n_{PUCCH,1}^{(1)}$. Or, in case that the receiving end receives 2 data units, if the receiving end fails to decode (detect) a first data unit (i.e., data unit 0 corresponding to HARQ(0)) and successfully decodes a second data unit (i.e., data unit 1 corresponding to HARQ-ACK(1)) (i.e., in case of NACK/DTX, ACK in the Table 6), the receiving end transmits 2 bits (0, 0) using the ACK/NACK unit $n_{PUCCH,1}^{(1)}$.

As mentioned in the foregoing description, the ACK/NACK information on a plurality of the data unit can be transmitted using one ACK/NACK unit in a manner of linking or mapping a combination (i.e., combination of selecting either $n_{PUCCH,0}^{(1)}$ or $n_{PUCCH,1}^{(1)}$ and b(0), b(1)) of a selection of the ACK/NACK unit and an actual bit content of a transmitted ACK/NACK unit to actual ACK/NACK contents. The ACK/NACK multiplexing for the data unit greater than 2 can be easily implemented by extending a principle of the aforementioned ACK/NACK multiplexing.

In the aforementioned ACK/NACK multiplexing scheme, if at least one ACK basically exists for all data units, an NACK may be not distinguished from a DTX (in particular, as represented as NACK/DTX in Table 6, the NACK and the DTX can be coupled). It is because all ACK/NACK states (i.e. ACK/NACK hypotheses) capable of being occurred in case of separately representing the NACK and the DTX cannot be reflected by a combination of the ACK/NACK unit and the symbol modulated by QPSK scheme only. Meanwhile, if the ACK does not exist for all data units (i.e., if the NACK or the DTX exists for all data units), a definite NACK for indicating one definite NACK (i.e., an NACK distinguished from a DTX) can be defined among the HARQ-ACK(i). In this case, an ACK/NACK unit corresponding to a data unit for indicating the definite NACK can be reserved to transmit signals of a plurality of ACK/NACK.

Semi-Persistent Scheduling (SPS)

DL/UL SPS (semi-persistent scheduling) designates a UE that which subframes (subframe interval and offset) are in charge of SPS transmission/reception by an RRC (radio resource control) signaling first, and then performs actual activation and release of the SPS via PDCCH. In particular, although the UE receives the SPS by the RRC signaling, if the UE receives (i.e., receiving PDCCH of which an SPS C-RNTI is detected) PDCCH for informing of activation (or reactivation), the UE does not immediately perform an SPS TX/RX but perform an SPS operation according to the PDCCH. In particular, if the UE receives an SRS activation PDCCH, the UE allocates a frequency resource according to an RB assignment designated by the PDCCH, applies a modulation and a coding rate according to MCS information, and may begin to perform the TX/RX with the subframe interval and offset assigned by the RRC signaling. Meanwhile, if the UE receives PDCCH for informing of an SRS release, the UE stops the TX/RX. If the PDCCH for informing of activation (or reactivation) is received, the stopped SPS TX/RX can resume the TX/RX with the subframe and the offset assigned by the RRC signaling according to the RB assignment, MCS, and the like designated by the PDCCH.

The PDCCH format currently defined by 3GPP LTE includes such various formats as a DCI format 0 for an UL and DCI format 1, 1A, 1B, 1C, 1D, 2, 2A, 3, 3A, and the like for a DL. Such a control information as a hopping flag, RB allocation, an MCS (modulation coding scheme), an RV (redundancy version), an NDI (new data indicator), a TPC (transmit power control), a cyclic shift DMRS (demodulation reference signal), a UL index, a CQI (channel quality information) request, a DL assignment index, a HARQ process number, a TPMI (transmitted precoding matrix indicator), a PMI (precoding matrix indicator) confirmation, and the like is transmitted in a form of a combination of being selected in accordance with each usage.

More specifically, using a PDCCH as a usage of SPS scheduling activation/release can be validated in case that a CRS of a DCI transmitted on the PDCCH is masked with an SPS C-RNTI and an NDI is set to 0. In this case, in case of SPS activation, a virtual CRC is used in a manner of setting a combination of a bit field to 0 as depicted in Table 7.

TABLE 7

| | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: MSB is set to '00' |

When an error not capable of being checked by a CRC occurs, the virtual CRC is configured to have an ability of additional error detection in a manner of checking whether a corresponding bit field value is a promised value. When an error occurs a DCI assigned to a different UE, if a specific UE cannot detect the corresponding error and the UE incorrectly recognizes the error as an SPS activation of the UE, since the UE continuously uses a corresponding resource, one time error may cause a consistent problem. Hence, a wrong detection of an SRS can be avoided by the use of the virtual CRC.

In case of an SRS release, the virtual CRC can be used by setting a bit field value as depicted in Table 8.

TABLE 8

| | DCI format 0 | DCI format 1A |
|---|---|---|
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | set to all'1's |

PUCCH Piggyback

In case of an uplink transmission of a legacy 3GPP LTE system (e.g., release-8), a single carrier transmission of a good PAPR (peak-to-average power ratio) or a good CM (cubic metric) influencing the performance of a power amp is maintained to efficiently utilize the power amp of a UE. In particular, in case of a PUSCH transmission of a legacy LTE system, a single carrier property of a data intended to be transmitted is maintained by a DFT-precoding. In case of a PUCCH transmission, the single carrier property can be maintained by transmitting a sequence having the single carrier property in a manner of loading information on the sequence. Yet, in case of non-contiguously assigning a DFT-precoded data to a frequency axis or in case of simultaneously transmitting PUSCH and PUCCH, the single carrier property is not maintained.

Figure 15:
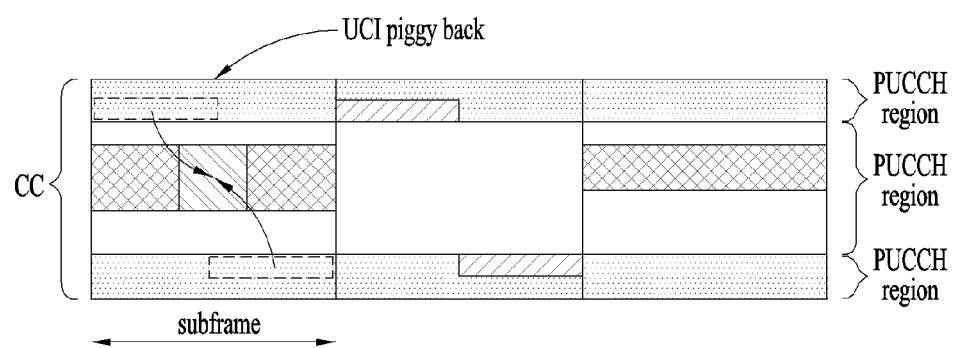
FIG. 15 is a diagram for explaining a scheme of transmitting uplink control information on PUSCH.

Hence, as depicted in FIG. 15, in case that there is PUSCH transmission in a subframe identical to PUCCH transmission, UCI (uplink control information) supposed to be transmitted on PUCCH is transmitted (piggyback) on PUSCH together with a data to maintain the single carrier property.

As mentioned in the foregoing description, since PUCCH and PUSCH cannot be transmitted in a legacy LTE UE at the same time, in a subframe to which the PUSCH is transmitted, a method of multiplexing the UCI (CQI/PMI, HARQ-ACK, RI, and the like) in the PUSCH region is used. As an example, in case of transmitting CQI and/or PMI in a subframe assigned to transmit PUSCH, control information and a data can be transmitted together by multiplexing UL-SCH data and the CQI/PMI prior to a DFT-spreading. In this case, the UL-SCH data performs a rate-matching in consideration of a CQI/PMI resource. And, such control information as a HARQ ACK, an RI, and the like can be multiplexed in a PUSCH region in a manner of puncturing the UL-SCH data.

Figure 16:
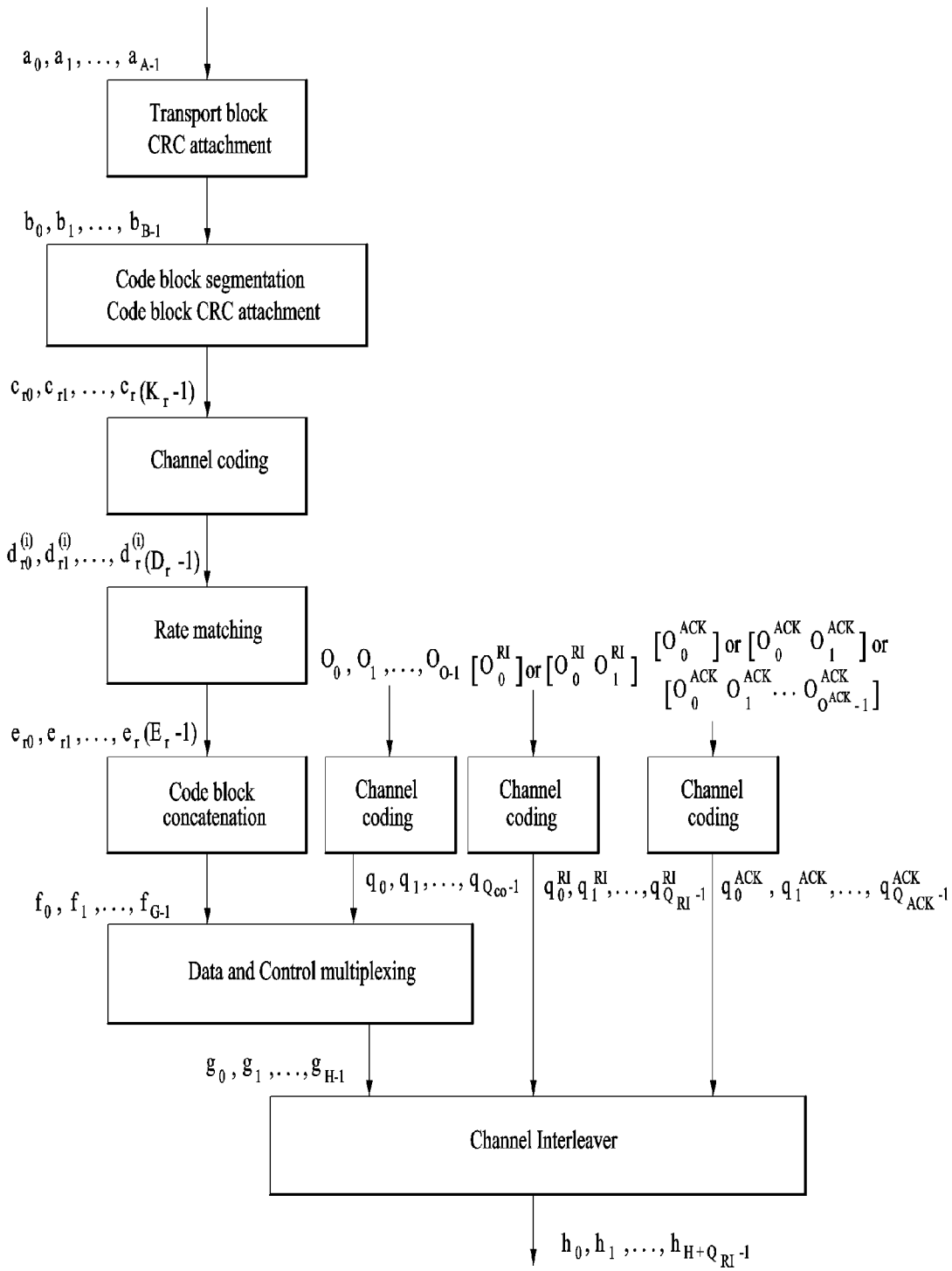
FIG. 16 is a diagram for explaining a multiplexing process of a data and control information to be transmitted in an uplink.

FIG. 16 is a diagram for explaining a multiplexing process of a data and control information to be transmitted in an uplink.

As depicted in FIG. 16, after attaching a CRC (cyclic redundancy check) used for a transport block to the transport block (hereinafter abbreviated TB) (a0, a1, . . . , aA−1), which is to be transmitted in UL, data information multiplexed together with control information is divided into a plurality of code blocks (hereinafter abbreviated CB) according to a size of the TB, and a CRC used for the CB is attached to a plurality of the CBs. A channel coding is performed for a result value of a previous step. Moreover, channel coded data pass through a rate matching and a concatenation between code blocks is performed, and then, the concatenated CBs are multiplexed with a control signal.

Meanwhile, a separate channel coding is performed for the CQI/PMI (o0, o1, . . . , oo−1) irrespective of a data. The channel coded CQI/PMI is multiplexed with a data. The CQI/PMI information and a multiplexed data are inputted to a channel interleaver.

And, a separate channel coding is performed for rank information ([o0RI] or [o0RI o1RI]) irrespective of a data [S511]. The channel coded rank information is inserted to a part of an interleaved signal by such a process as a puncturing and the like.

In case of ACK/NACK information ([o0ACK] or [o0 ACK o1 ACK] . . . ), a separate channel coding is performed irrespective of a data, CQI/PMI, and rank information. The channel coded ACK/NACK information is inserted to a part of an interleaved signal by such a process as a puncturing and the like.

Meanwhile, a current LTE/LTE-A system uses time-frequency resource of a licensed band. In the past, since the number of communication terminal is not many, frequency resource was sufficient although a specific service provider exclusively uses the licensed band. Yet, as ubiquitous computing is activated and demand for high data throughput increases, demand for the frequency resource is rapidly increasing. Consequently, a shortage problem of the frequency resource is actualized. Hence, a technology for using an unlicensed band is currently holding the spotlight. Therefore, the current LTE/LTE-A system operating based on a licensed band can be extended to use an unlicensed band. In the following description, methods of transmitting PDSCH and/or PUSCH on a licensed exempt band are explained based on the aforementioned contents.

Figure 17:
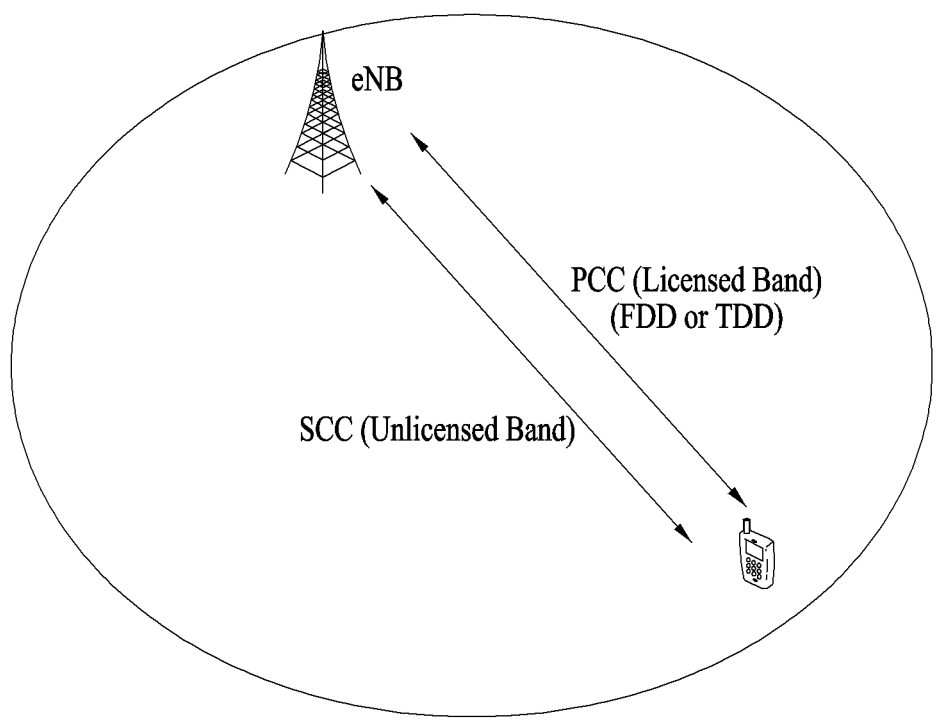
FIG. 17 is a schematic diagram of a whole system according to embodiment of the present invention.

For clarity, as depicted in FIG. 17, assume a system using two cells in the following description. Assume that one cell (e.g., PCell) corresponds to a licensed band and the other cell corresponds to an unlicensed band. Yet, this is just exemplary and more Scells (e.g., LTE/LTE-A frequency band and/or unlicensed band) may exist in a serving cell. In this case, the PCell and the Scell are mentioned in terms of a carrier aggregation. A resource (PDSCH and/or PUSCH) on the unlicensed band can be directed by PDCCH of the PCell. Yet, the carrier aggregation is not applied to all explanations in the following description. The PDSCH and/or PUSCH on the unlicensed band may be directed by the PDCCH transmitted on the unlicensed band. And, in case that the PDSCH and/or PUSCH on the unlicensed band is directed by the PDCCH transmitted on the licensed band, the aforementioned cross carrier scheduling may not need to be mandatorily applied.

Subsequently, referring to FIG. 17, an eNode B (eNB) can transmit the PDSCH on the unlicensed band and a UE can transmit the PUSCH on the unlicensed band. In this case, although a time unit used for transmitting the PDSCH and/or the PUSCH on the unlicensed band is identical to a subframe, a slot, an OFDM symbol, and the like on the licensed band, this is just exemplary. And, the unlicensed band in relation with the present invention can use a slot (the slot can be divided into a UL slot and a DL slot) in a time axis in LTE system as a basic unit. This is because a timing point of a carrier sensing is related to the front and the rear of a slot as described in the following description.

The carrier sensing should be performed to transmit a signal on the unlicensed band. The carrier sensing means to check whether an unlicensed band is used by a different device when an eNode B or a UE intends to use the unlicensed band. As a result of performing the carrier sensing, if the unlicensed band is used by a different device (busy), the eNode B or the UE cannot transmit a signal and PDSCH/PUSCH can be transmitted when the unlicensed band is in an idle state.

Meanwhile, the following descriptions are sequentially explained according to embodiment.

i) Scheduling after a carrier sensing in transmitting PDSCH on an unlicensed band ii) Carrier sensing after scheduling in transmitting PDSCH on an unlicensed band iii) PUSCH transmission on an unlicensed band iv) Preamble transmission for a synchronization acquisition in transmitting PDSCH/PUSCH on an unlicensed band In this case, i) to iv) are explained under an assumption of an OFDM scheme for clarity, an OFDMA scheme can also be applied as described later.

Embodiment 1

Figure 18:
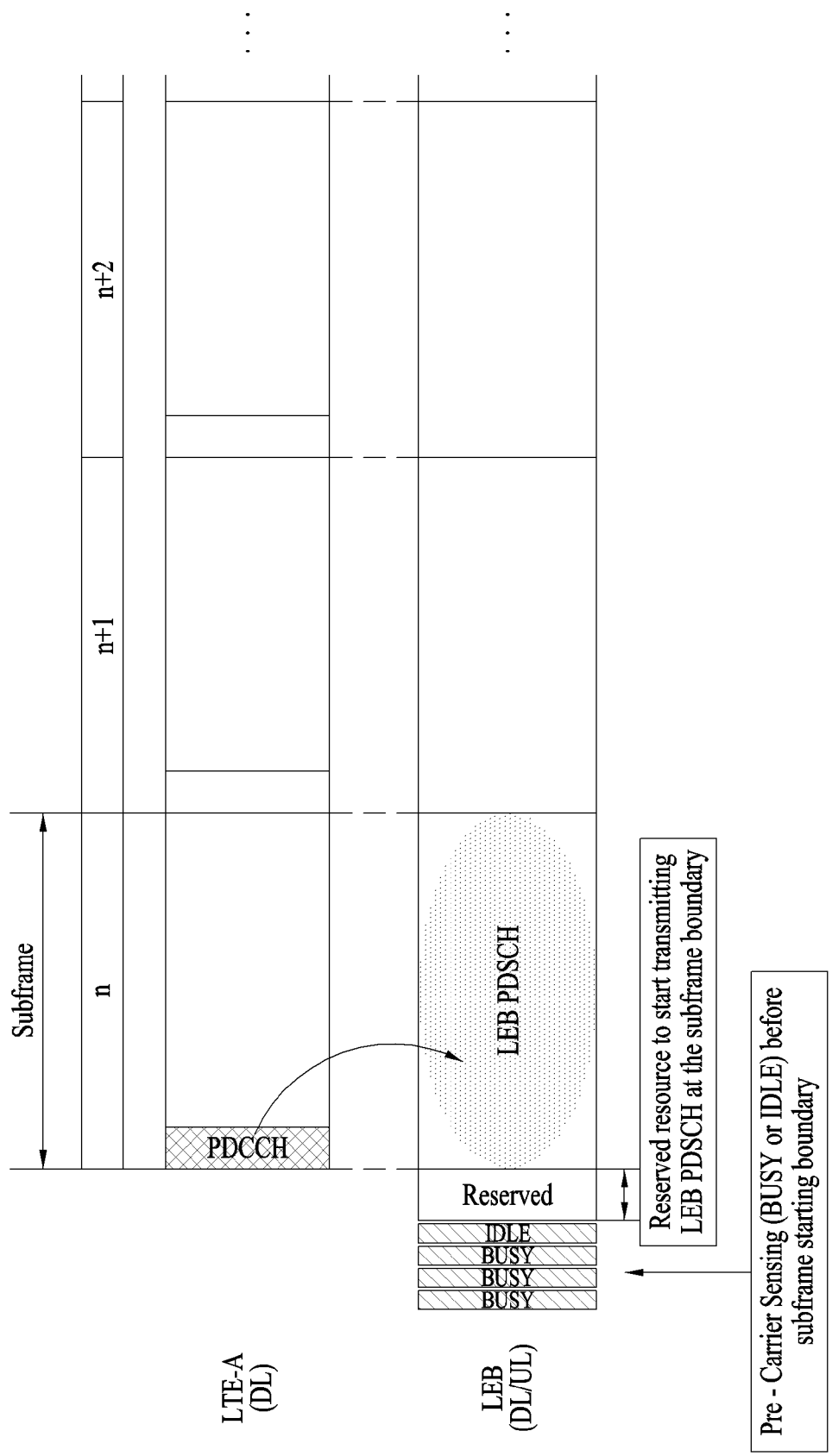
FIG. 18 is a diagram for explaining a PDSCH transmission on an unlicensed band according to an embodiment 1 of the present invention.

FIG. 18 is a diagram for explaining a PDSCH transmission on an unlicensed band according to one embodiment of the present invention.

Specifically, FIG. 18 depicts an example of performing a scheduling for an unlicensed band in case that a carrier sensing is performed first to transmit PDSCH on the unlicensed band and the unlicensed band is available as a result of the carrier sensing. Detail explanation as follows.

As depicted in the diagram, an eNode B performs a carrier sensing from a previous time of a subframe n to transmit PDSCH in the subframe n on an unlicensed band. As depicted in FIG. 18, the carrier sensing can be performed with a specific interval and the specific interval may correspond to an OFDM symbol space of a subframe. Yet, a shorter interval or a longer interval compared to the OFDM symbol space can be applied as the specific interval of the carrier sensing.

While performing the carrier sensing with the specific interval, the eNode B judges that the unlicensed band is available in a random timing point before the subframe n, the eNode B can schedule the PDSCH on the unlicensed band. This scheduling information can be transmitted on the PDCCH of a licensed band. In this case, as depicted in FIG. 18, as a result of performing the carrier sensing, if a timing point that the unlicensed band is available is ahead of a start point of a subframe to which the PDCCH is transmitted, i.e., the timing point of starting to transmit the subframe n, a reservation is necessary for a different device capable of using the unlicensed band not to use the unlicensed band from the point of which the unlicensed band is available to the point of a transmission start point of the subframe n. In other word, if the eNode B transmits no signal in a time period represented as 'reserved' in FIG. 18, a different device will perform a carrier sensing, judges that the different device can use the unlicensed band, and transmits a signal. In this case, the eNode B cannot transmit the PDSCH in the subframe n.

Hence, the eNode B can solve the aforementioned problem in a manner of transmitting a reservation signal in the time period represented as 'reserved'. In this case, the reservation signal may correspond to a specific signal configured to inform different devices intended to use the unlicensed band that the eNode B uses the unlicensed band in the time period. In particular, the reservation signal may correspond to a signal promised in advance and capable of being commonly identified by the devices intended to use the unlicensed band. And, the reservation signal may correspond to a dummy signal formed by a specific sequence or a sequence generated by the specific sequence as a seed. As mentioned in the foregoing description, as a result of the carrier sensing, although the timing point that the unlicensed band is available is ahead of the start point of a subframe (a time period corresponding to a subframe of a licensed band), which intends to transmit PDSCH, the eNode B can transmit a scheduled PDSCH without any problem in a manner of transmitting the reservation signal.

Unlike FIG. 18, if the carrier sensing is performed from the start point of the subframe n and if it is judged that the unlicensed band is available for a prescribed time, PDSCH transmission can only be performed for a time period shorter than one subframe time period. In this case, it may transmit PDSCH including a reduced time period using such a method as a rate matching used in LTE/LTE-A system. There exists a problem that a UE cannot know a start timing point of PDSCH transmission. Hence, the start timing point of the PDSCH transmission can be configured in advance as time (e.g., a first, a second, a third OFDM symbol) corresponding to a specific OFDM symbol in a subframe. The UE can find out the start point of the PDSCH transmission in a manner of performing a blind detection for the time.

Meanwhile, unlike the diagram depicted in FIG. 18, the PDSCH is scheduled using an R-PDCCH and the PDSCH can be transmitted together with a backhaul subframe. In this case, there is a merit in that the PDSCH transmission timing point is fixed.

Embodiment 2

Embodiment 2 relates to a method of performing a scheduling first and then performing a carrier sensing to transmit PDSCH on the unlicensed band. Unlike the embodiment 1, since PDSCH transmission is scheduled without checking whether the unlicensed band is available by performing the carrier sensing, if the unlicensed band is not available, the PDSCH transmission can be delayed or may fail to transmit the PDSCH. In order to solve the aforementioned problem, the PDSCH transmission can be configured as a part of region of a subframe time period. This shall be described with reference to FIG. 19.

Figure 19:
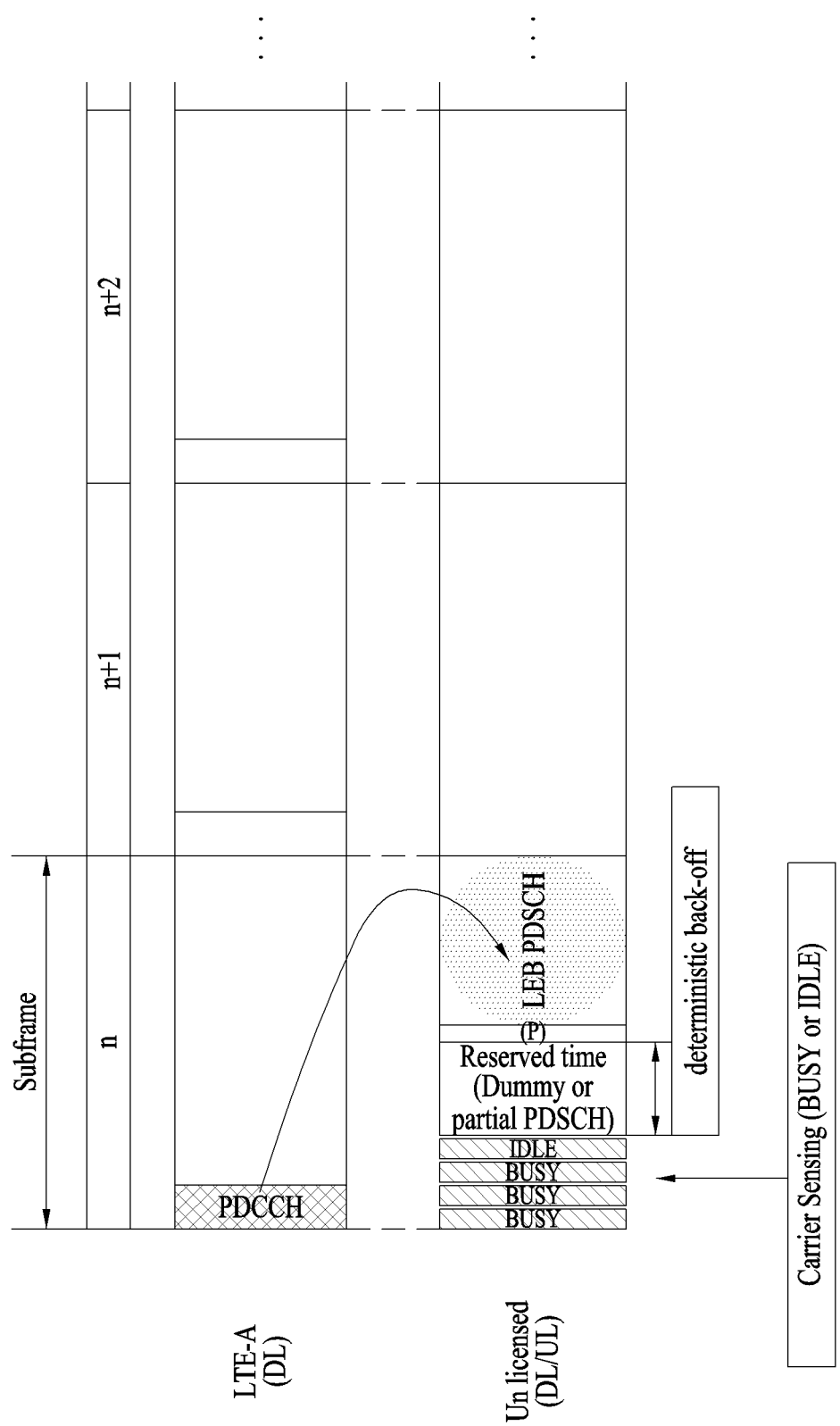

FIG. 19 is a diagram for explaining a PDSCH transmission on an unlicensed band according to a different embodiment of the present invention. An eNode B can schedule a PDSCH transmission for a part of time period of the unlicensed band corresponding to a length of a subframe of a licensed band. In this case, the part of time period may correspond to a half of a subframe, i.e., a second slot as depicted in FIG. 19. Yet, this is exemplary only. The part of time period can be variously configured such as the time period from a nth ($0<n\le 8$) OFDM symbol of the subframe to the last symbol of the subframe and the like.

Subsequently, the eNode B starts the carrier sensing from a start point of a subframe to transmit a scheduled PDSCH. In this case, similar to the aforementioned embodiment 1, the carrier sensing can be contiguously performed with a specific interval (e.g., OFDM symbol space of a subframe and the like). As a result of performing the carrier sensing, if the unlicensed band is available (IDLE) previous to the start point of the scheduled PDSCH transmission, the eNode B can transmit PDSCH. Yet, if it is judged that the unlicensed band is available previous to the scheduled timing point of PDSCH transmission, it may be necessary to transmit a reservation signal to the unlicensed band. Specifically, in case that there is a space between the start point of the PDSCH transmission and the timing point of which the unlicensed band is available, if different devices intended to use the unlicensed band use the unlicensed band in the space, it may fail to transmit the PDSCH. Hence, it is able to stably transmit a scheduled PDSCH by transmitting the reservation signal similar to the aforementioned signal in the embodiment 1, i.e., a specific signal or a dummy signal configured to inform the different devices intended to use the unlicensed band that the eNode B currently uses the unlicensed band in the space (time period). And, the reservation signal may correspond to a signal generated by copying a front part of the scheduled PDSCH or a rear part of the scheduled PDSCH (cyclic shift scheme).

Since an MCS of the PDSCH transmitted on a second slot can be calculated from the MCS informed by PDCCH, it may be not necessary to separately have additional information. Naturally, the MCS of the PDSCH transmitted on the second slot can be directly informed. Or, the MCS for one subframe or the MCS for a half subframe (one slot) can be included in a DCI of PDCCH. A UE can determine whether it is one subframe or a half subframe in a manner of performing a blind decoding.

Or, it may be able to transmit a signal (e.g., a preamble or a sequence) capable of informing a start point of PDSCH transmitted on the unlicensed band to enhance accuracy of demodulation. The signal may correspond to a preamble sequence masked with a UE identifier (UE ID) or generated based on the UE ID. This method is advantageous when the sequence is transmitted immediately after a carrier sensing. For instance, as a result of performing the carrier sensing, if the unlicensed band is available on a third OFDM symbol, start of the PDSCH transmission can be informed by transmitting a sequence or a preamble to a fourth OFDM symbol. Yet, if the length of the PDSCH is variable, although there is a drawback of inferring an MCS, it may increase resource utilization rate.

PDSCH can be transmitted in a manner of dividing a subframe into a smaller unit (e.g., PDSCH is transmitted by a unit of 12, 10, 8, 7 OFDM symbols length in a manner of splitting a subframe to OFDM 2 symbol bundles) and an MCS can be inferred by calculation or can be individually signaled.

Meanwhile, unlike the contents described in FIG. 19, if the start point of PDSCH transmission is not fixed to a specific timing point and it is determined that an unlicensed band is available after a carrier sensing, the PDSCH can be transmitted with a back-off time of a minimum or 0. Yet, in this case, since it is difficult for a UE to know the start point of the PDSCH transmission and it is difficult to calculate the MCS, it is necessary to additionally inform the UE of the informations.

Or, the start point of the PDSCH transmission can be semi-statically configured. For instance, if PDSCH is configured with an upper layer signal (RRC signal) to start on a symbol n, a carrier sensing can be performed previous to the symbol n. In this case, as a result of performing the carrier sensing, if the unlicensed band is available (IDLE), the PDSCH can be transmitted on the symbol n. If the timing point of which the unlicensed band is available is previous to the symbol n, the aforementioned method of transmitting a reservation signal can be used. As a different method, there is a method of using a transmission waiting counter. As a unit time elapses, a value of the corresponding counter is reduced. If the value becomes 0, PDSCH is transmitted. If a transmission of a different device starts before the value becomes 0, PDSCH transmission is abandoned. A scheduler can differently configure the start point of the PDSCH transmission according to a success rate of a carrier sensing.

And, the length of a scheduled PDSCH can be variably managed. In this case, it is necessary to inform of such information as a start point of the PDSCH, a length of the PDSCH, and an end point of the PDSCH. The information can be transmitted using a part of field of PDCCH. Or, both the start point of the PDSCH and information on the length of the PDSCH can be transmitted in a manner of transmitting a preamble. This is helpful when an unlicensed band and a licensed band are not synchronized with each other although the unlicensed band is managed in accordance with a structure of a subframe and a slot of the licensed band.

As mentioned in the foregoing description, since the aforementioned method schedules the PDSCH transmission on the unlicensed band previous to the carrier sensing, if the unlicensed band cannot be continuously used as a result of performing the carrier sensing, a lastly scheduled PDSCH may fail to be transmitted. If PDCCH is received but PDSCH is not received on the unlicensed band, a UE may be aware that the UE did not receive the PDSCH. The UE can decode a different signal instead of the PDSCH not transmitted. Hence, in case that the PDSCH transmission is failed due to not using the unlicensed band, an eNode B can indicate the UE to discard informations, which are stored in a buffer, on a region previously scheduled for the PDSCH. This indication can be transmitted on a PDCCH of a next subframe and can be included in a PDCCH after k subframe. Or, the indication can be delivered using a different signal (e.g., a different physical channel, an upper layer signaling, and the like) except the PDCCH.

Figure 20:
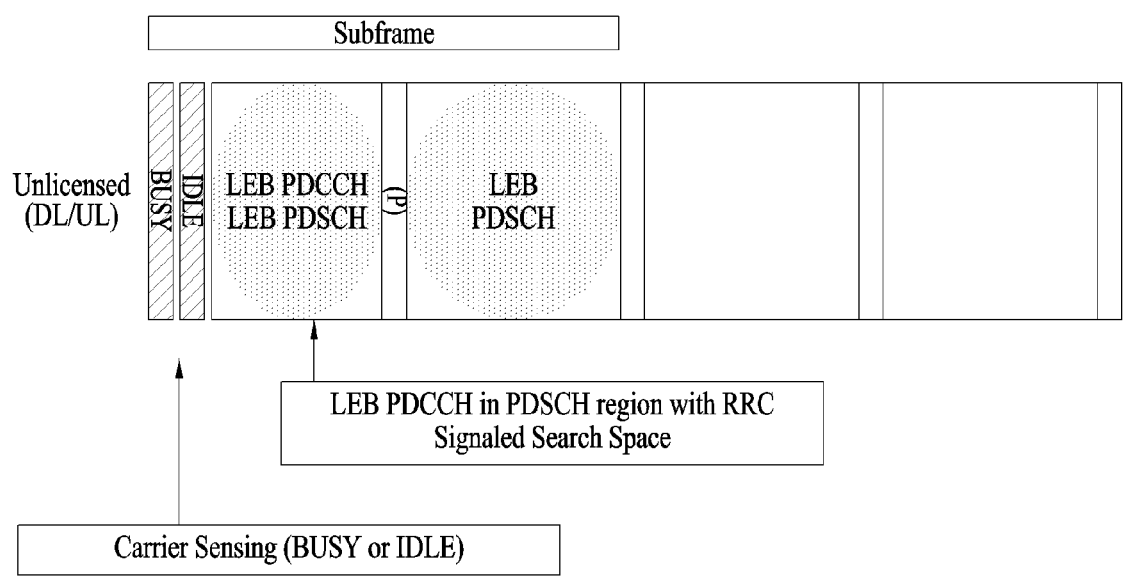

FIG. 20 depicts that PDSCH of the unlicensed band is indicated not by PDCCH of a licensed band but by the PDCCH of the unlicensed band. In particular, as depicted in FIG. 20, the PDCCH including the PDSCH and scheduling information of the PDSCH can be transmitted from the point (or after a prescribed back-off time) of which the unlicensed band is available after performing a carrier sensing.

FIG. 21 is a diagram indicating a variable slot for transmitting PDSCH according to the timing point of which the unlicensed band is available after performing the carrier sensing. Referring to FIG. 21 (a), if the timing point of which the unlicensed band is available is greater than a prescribed OFDM symbol from a first OFDM symbol of a subframe, PDSCH is transmitted on a second slot of the subframe. Compared to this, referring to FIG. 21 (b), since the timing point of which the unlicensed band is available is less than a prescribed OFDM symbol, PDSCH is transmitted on both a first slot and the second slot. In this case, the prescribed OFDM symbol can be variously configured as 2, 3 OFDM symbols, and the like. Instead of the OFDM symbol, a carrier sensing unit can be a reference of the PDSCH transmission.

Embodiment 3

Embodiment 3 relates to a method of transmitting PUSCH on an unlicensed band. This shall be described with reference to FIG. 22.

Figure 22:
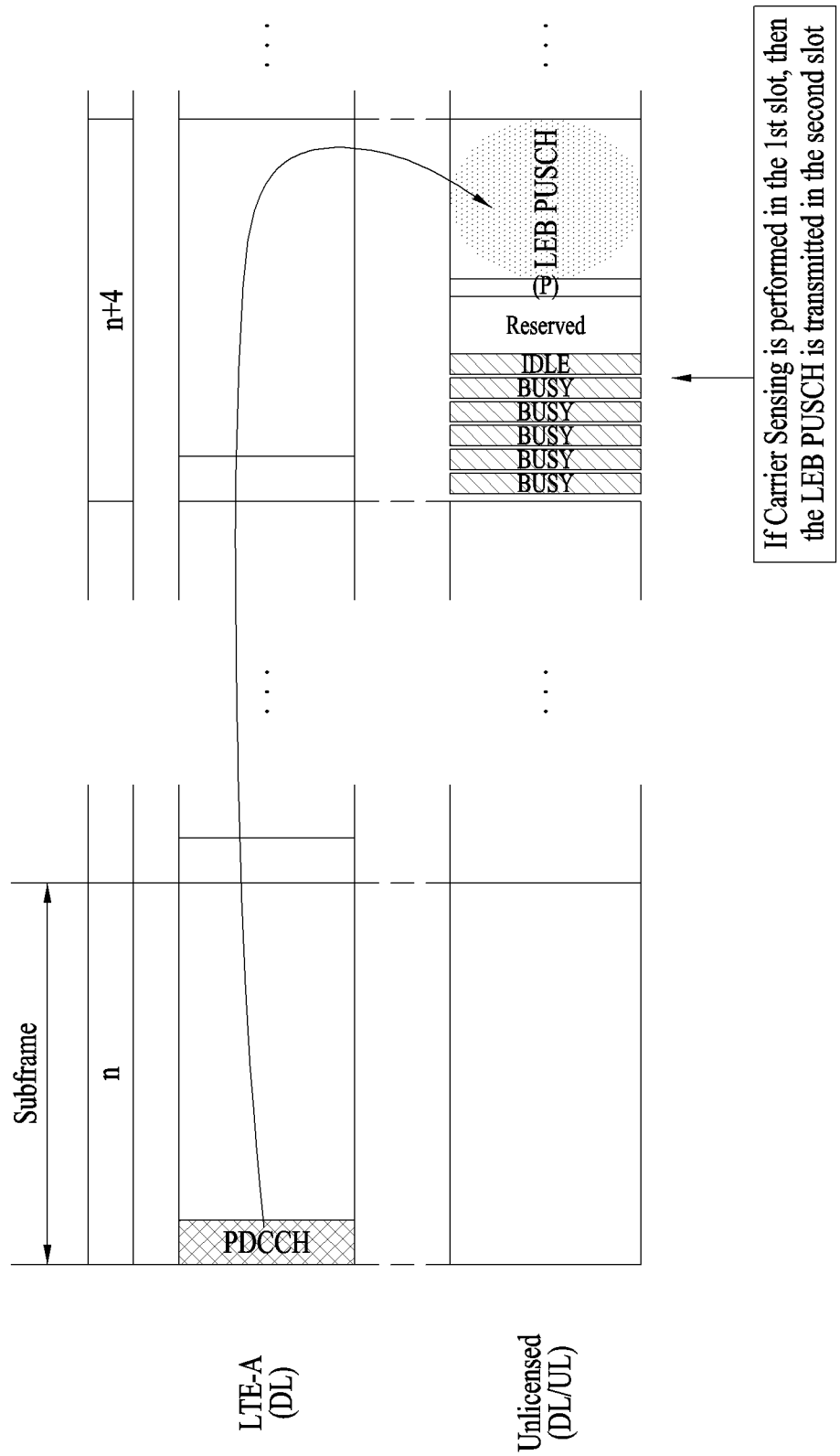
FIG. 22 is a diagram for explaining a PUSCH transmission on an unlicensed band according to an embodiment 3 of the present invention.

Referring to FIG. 22, PDCCH transmitted in a subframe n of a licensed band transmits PUSCH in a time period corresponding to a subframe n+4 of the licensed band. A UE can perform a carrier sensing from a start point of the subframe n+4 to transmit a scheduled PUSCH. If it is judged that the unlicensed band is available as a result of the carrier sensing, the UE can transmit the PUSCH on the unlicensed band. In this case, if the timing point on which the unlicensed band is determined to be available is ahead of the start point of PUSCH transmission, the aforementioned reservation signal can be transmitted for a reserved period. The method depicted in FIG. 22 is one of various methods of transmitting PUSCH and such explanations for transmitting the PDSCH on the unlicensed band as a timing point of performing a carrier sensing, a length of PUSCH transmission, an MCS, and the like can be applied.

Meanwhile, while sticking to a regulation related to a transmission on the unlicensed band, a resource for a PUSCH transmission can be reserved by such a specific signal as an UL grant prior to a plurality of subframes. In particular, the UL grant enables a specific subframe, a slot, or an OFDM symbol following the UL grant to transmit PUSCH. For instance, in case of managing in a slot unit, a carrier aggregation is performed on a first slot of a subframe coming in n+4 after receiving the UL grant or the carrier aggregation is performed on immediately before the first slot (if a previous n+3 subframe is configured for a DL transmission, a last OFDM symbol or a part of a subframe may become a reduced subframe not capable of being transmitted due to a carrier sensing). If the n+3 subframe is configured for an UL transmission, PUSCH should be transmitted in a manner of excluding a period corresponding to the last OFDM symbol or the carrier sensing. If the unlicensed band is available (IDLE), PUSCH is transmitted.

Or, if the unlicensed band is available (IDLE) in a manner of receiving the UL grant and performing the carrier sensing, PUSCH is transmitted after a prescribed time (random back-off time) elapses. Yet, an upper limit and a lower limit of the random back-off time are designated and one value can be selected between the upper limit and the lower limit. For instance, the random back-off time is not fixed by such a time as n+4. The degree of freedom is given to the random back-off time to transmit PUSCH on several designated times such as n+3, n+5, or the like. By doing so, a resource can be fairly shared by a UE and a different system device.

For instance, the random back-off time is designated to 4~6 and one value among the 4~6 can be selected.

Embodiment 4

Embodiment 4 is about transmitting a preamble to acquire synchronization in a time interval between a timing point where an unlicensed band becomes available as a result of a carrier sensing and a timing point immediately before PDSCH or PUSCH is transmitted. Embodiment 4 is explained with reference to FIG. 24 to FIG. 26. Although FIG. 24 to FIG. 26 exemplifies a case that an eNode B transmits PDSCH on an unlicensed band, by which the present invention may be non-limited. In case of each of the aforementioned embodiment 1 to embodiment 3, the case can be applied within a range not conflicted with each other. And, as mentioned earlier in the embodiment 2, a preamble may correspond to a preamble sequence masked with a UE identifier (ID) or generated based on the UE ID.

Figure 24:
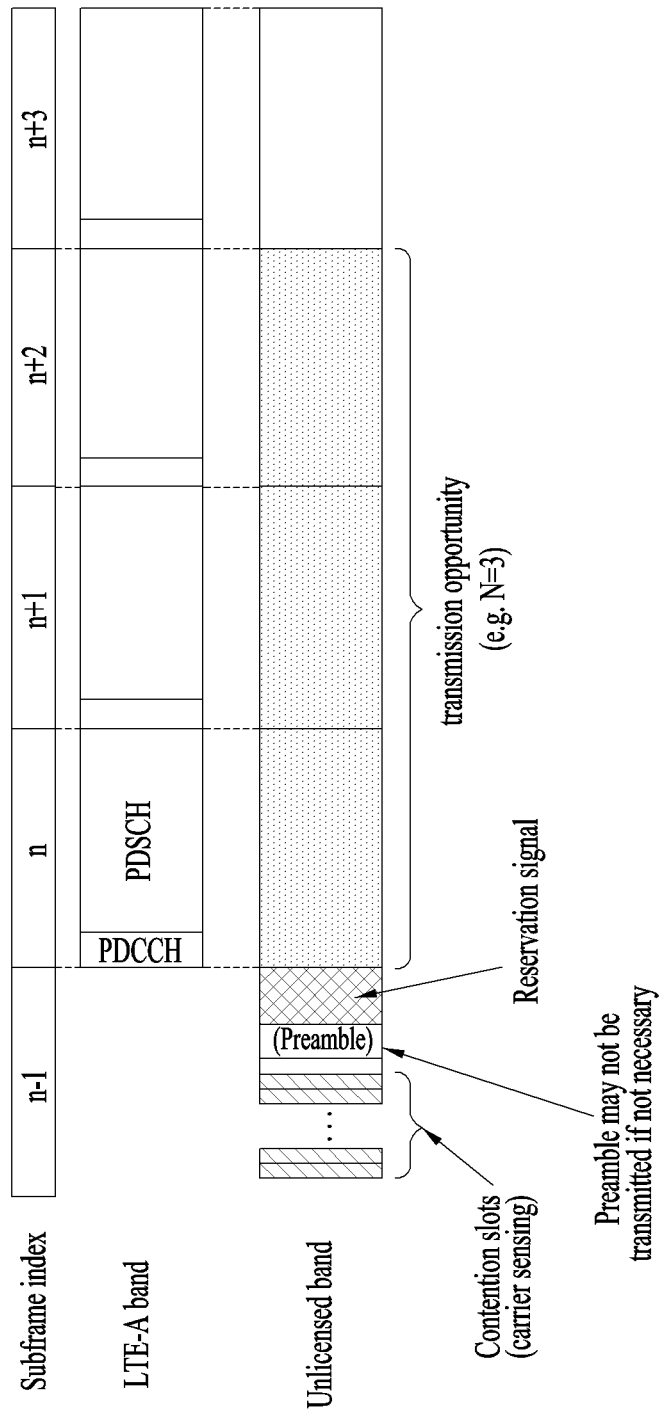
FIG. 24 to FIG. 26 is a diagram for explaining a preamble transmission in transmitting PDSCH on an unlicensed band according to one embodiment of the present invention.

FIG. 24 is a diagram for explaining a preamble transmission in transmitting PDSCH on an unlicensed band according to one embodiment of the present invention.

Referring to FIG. 24, it is able to know that a preamble is transmitted prior to a reservation signal. Specifically, an eNode B performs a carrier sensing to check whether an unlicensed band is available in n−1 subframe. If the unlicensed band is available as a result of the carrier sensing, the eNode B can transmit a preamble after having a prescribed back-off time. As depicted in FIG. 24, a reservation signal can be transmitted during a time interval immediately after the preamble is transmitted and immediately before PDSCH is transmitted.

In this case, the preamble transmitted prior to the reservation signal may perform a role of informing a UE of a start of transmitting the reservation signal. Moreover, the preamble simultaneously performs a function of the reservation signal as well. In particular, as mentioned in the foregoing description, the reservation signal is used to transmit a dummy signal and the like in order for different devices longing for a use of an unlicensed band not to use the unlicensed band between a timing point where the unlicensed band becomes available and a timing point immediately before PDSCH is transmitted. Transmitting a preamble also performs a function of prohibiting different devices from using the unlicensed band.

Hence, an eNode B can secure a resource required for a PDSCH transmission on an unlicensed band in a manner of transmitting a reservation signal immediately after a preamble transmission. In this case, the secured resource of the unlicensed band may correspond to the number of subframes corresponding to a transmission opportunity (more precisely, it may correspond to the resource of the unlicensed band corresponding to the number of subframes of a licensed band used by an eNode B). FIG. 24 depicts an example that the transmission opportunity is configured by 3. Although a transmitted preamble is configured for a synchronization of a reservation signal, a UE can acquire synchronization for PDSCH transmission using a position of the preamble, duration of the reservation signal, and a boundary of a reception subframe.

According to FIG. 24, although it is depicted as a reservation signal is transmitted, as mentioned in the foregoing description, if a timing point where an unlicensed band becomes available as a result of performing a carrier sensing corresponds to either a subframe boundary or a slot boundary of a licensed band used by an eNode B, since it is not necessary to transmit the reservation signal, it can be omitted. And, PDSCH transmission on the unlicensed band may be scheduled before the carrier sensing or may be scheduled after the carrier sensing. Detailed explanation for the PDSCH transmission is replaced by the explanation on the embodiment 1 and 2.

As mentioned in the foregoing description, scheduling information on PDSCH transmitted on the unlicensed band can be delivered to a UE by PDCCH transmitted on a licensed band. Unlike the FIG. 24, the scheduling information on PDSCH may be transmitted via PDCCH on the unlicensed band. If a preamble includes necessary scheduling informations besides an identifier of the UE receiving PDSCH, it may manage a scheme of not receiving scheduling information on the unlicensed band via PDCCH.

Figure 25:
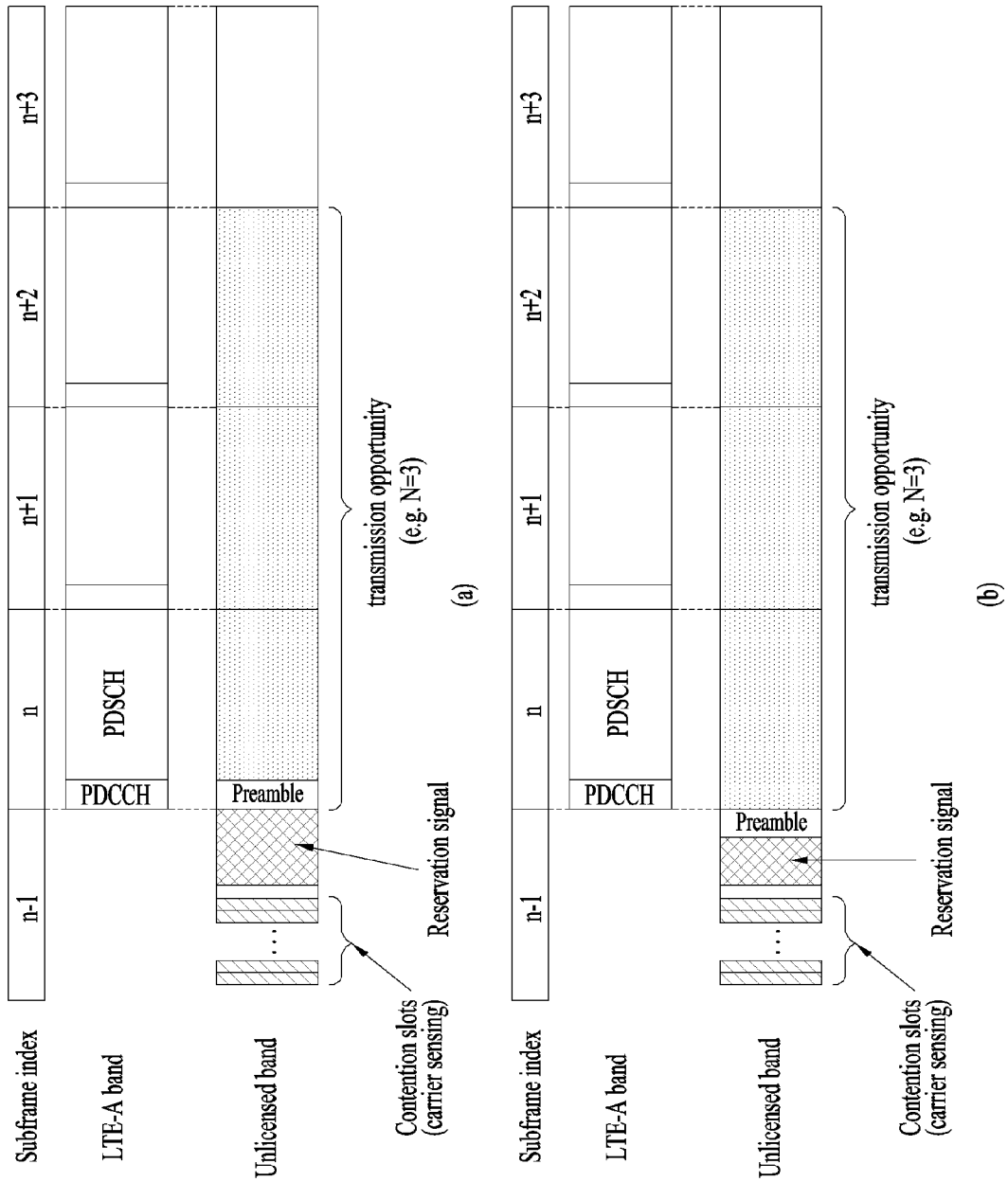

FIG. 25 is a diagram for explaining a preamble transmitted immediately after a reservation signal in transmitting PDSCH on an unlicensed band according to one embodiment of the present invention. FIG. 25 (a) indicates a preamble transmitted on a start timing of a subframe of a licensed band while the preamble is transmitted immediately after a reservation signal. FIG. 25 (b) indicates a preamble transmission completed on a start timing of a subframe of a licensed band. In particular, as depicted in FIG. 25 (a) and FIG. 25 (b), both preambles are transmitted on a timing corresponding to a subframe boundary of the licensed band.

In this case, the preamble transmission can be used to acquire synchronization of PDSCH, which is to be contiguously transmitted, or to acquire synchronization of a subframe of a licensed band. In particular, in terms of a UE, if a preamble is received, since the UE is able to aware that PDSCH is to be transmitted immediately after the preamble, the UE can precisely know a reception timing of the PDSCH.

Meanwhile, referring to FIG. 25, although it is depicted as the preamble transmission is performed on a timing corresponding to a subframe boundary of a licensed band, the preamble transmission can be performed on a slot boundary. In particular, as mentioned earlier in FIG. 19, in case that PDSCH transmission is performed by a slot unit on an unlicensed band, a preamble can be transmitted on a slot boundary. If the unlicensed band is used by a random time interval unit without using a subframe or a slot unit of the licensed band, the preamble transmission may be used to acquire synchronization for PDSCH transmission for the random time interval.

Figure 26:
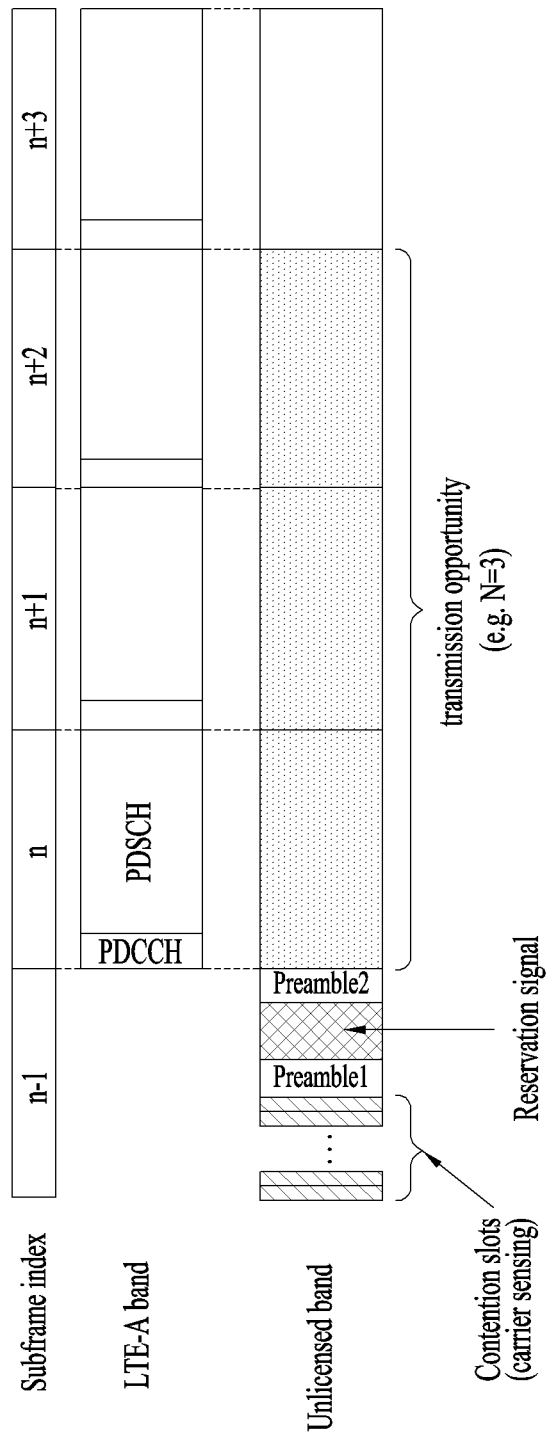

FIG. 26 indicates that a preamble is transmitted in twice, i.e., before a reservation signal is transmitted and after the reservation signal is transmitted. In particular, FIG. 26 indicates both the preamble configured for transmission synchronization of the reservation signal explained in FIG. 24 and the preamble configured for transmission synchronization of PDSCH explained in FIG. 25. By doing so, a receiving side may be able to precisely recognize the synchronization (or subframe synchronization of a licensed band) for the reservation signal and PDSCH transmission. In this case, an identical preamble is used for a preamble (preamble 1) transmitted prior to a reservation signal and a preamble (preamble 2) transmitted after the reservation signal. The receiving side can manage the identical preamble in order for the receiving side to identify that the identical preamble is used for which synchronization acquisition according to a transmission sequence. Or, both the preamble 1 and the preamble 2 may be consisted of sequences different from each other. For instance, if the preamble 1 and the preamble 2 are consisted of sequences different from each other, a sequence generated from a UE identifier can be used for the preamble transmitted prior to the PDSCH transmission only.

The aforementioned preamble may use a time resource corresponding to at least one OFDM symbol in a time axis. Or, a transmission time unit may be determined in consideration of different devices intending to use an unlicensed band.

Meanwhile, preamble transmission can be performed on every PDSCH transmission. Yet, the preamble transmission may not be performed in some cases. For instance, after a reservation signal, a preamble, PDSCH, and the like are transmitted to a specific UE, if PDSCH and the like are transmitted again to the specific UE within a prescribed time, the preamble transmission may be omitted. Or, the preamble transmission can be configured to be performed according to a predetermined cycle.

Figure 23:
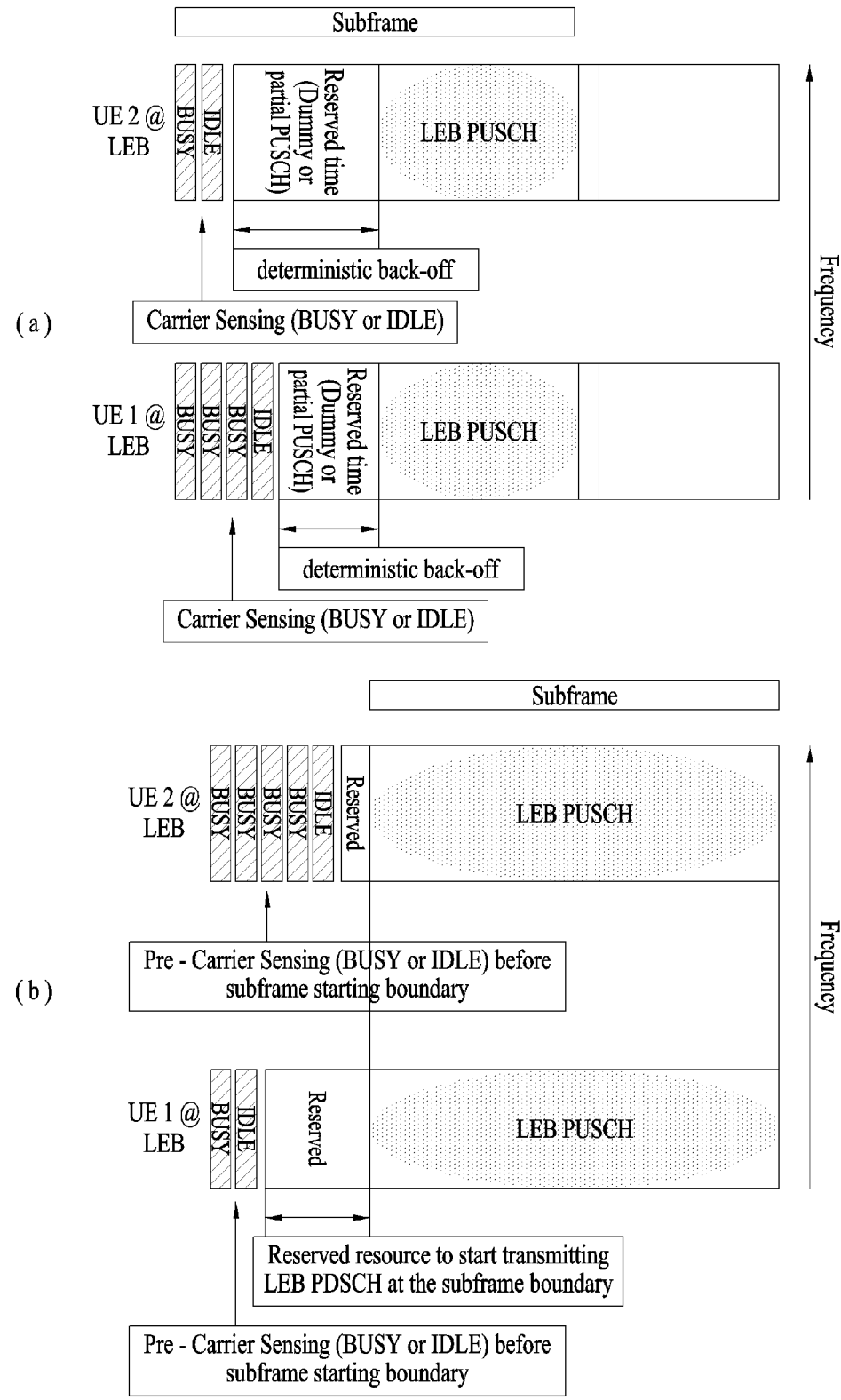
FIG. 23 is a diagram for explaining a case that an OFDMA is applied to embodiments of the present invention.

Although the aforementioned explanations are described under premise of an OFDM scheme, embodiments of the present invention can be applied by an OFDMA scheme. In particular, as depicted in FIG. 23, a UE 1 and a UE 2 can be configured to perform a PUSCH transmission in a manner that the unlicensed band is separated from a frequency resource. Such detail contents as a timing point of a carrier sensing, a unit, a length of a PUSCH subframe, transmission of a reservation signal, and the like are replaced by the aforementioned description. Moreover, although FIG. 23 depicts a PUSCH transmission, FIG. 23 can be applied to a case of a PDSCH transmission as well.

In the following description, items capable of being additionally added to the aforementioned PDSCH and PUSCH transmission on the unlicensed band are described.

i) DCI Transmitted on PDCCH

According to the aforementioned methods, the DCI transmitted on PDCCH can use a legacy LTE-A DCI formats as it is. Yet, such information as a start point of a subframe, an end point of a subframe, a length, an MCS, a carrier sensing position, and the like can be additionally added. In particular, in such a structure of which one UE occupies a whole unlicensed band for a prescribed time as an OFDM scheme, a carrier sensing and PDSCH and/or PUSCH transmission can get a help in a manner of broadcasting a start point, an end point, a length, and the like of a currently occupied packet or a transport block.

ii) Partially or No Applying a Carrier Aggregation

In case that a carrier aggregation is partially applied (partial cross carrier scheduling) or PDCCH is transmitted on the unlicensed band, the PDCCH may transmit a part of information only on PDSCH and/or PUSCH scheduled on the unlicensed band. For instance, MCS information can be included only. In particular, a HARQ, power control, RA information can be excluded. In particular, in order to distinguish the PDSCH transmitted to a UE from the PUSCH transmitted from a UE, a specific preamble is transmitted to a front part of the PDSCH to inform a transmission start position of the PDSCH while distinguishing a UE from a plurality of UEs and a specific preamble is transmitted to a front part of the PUSCH to inform which UE has transmitted the PUSCH and a transmission start position of the PUSCH. In this case, the preamble can perform a function of a reference signal as well as a function of distinguishing a UE. In this case, it is able to find out which UE owns a corresponding packet in a manner of using the reference signal generated by using a UE identifier (UE ID). Similar to the PUSCH, in case of the PDSCH, a receiving UE can be identified by checking the reference signal. A position to which the preamble or the reference signal is transmitted may correspond to a first or a last.

iii) Transmit Power Control

The transmit power of PDSCH and/or PUSCH transmitted on the unlicensed band uses a designated value and may not perform a separate power control. In particular, transmission on the unlicensed band can be configured to perform with a designated power for a designated time. A separate signal can be used to change the configuration. Most of the proposed regulation and method can be applied to the OFDMA scheme as well.

iv) Carrier Sensing (CS)

The aforementioned PDSCH or PUSCH transmission is a case that a whole bandwidth of the unlicensed band is used by an eNode B or a UE of LTE/LTE-A system. Specifically, in case of an example of a PDSCH transmission of the OFDM scheme, the eNode B performs a carrier sensing for the unlicensed band. If the unlicensed band is available (if necessary, the unlicensed band is reserved by transmitting a reservation signal), PDSCH is transmitted. In this case, the carrier sensing is performed for a whole bandwidth of the unlicensed band with a prescribed unit (e.g., OFDM symbol unit) in time axis and the PDSCH transmission is performed for the whole bandwidth of the unlicensed band as well. Yet, although it is judged that the whole bandwidth of the unlicensed band is not available, a part of the bandwidth may be available since the whole bandwidth of the unlicensed band is sufficiently wide or a bandwidth used by a device currently using the unlicensed band is small. In this case, although transmission can be performed in a manner of lowering MCS configuration or enduring a re-transmission, it cannot be a fundamental solution. Hence, in addition to the aforementioned carrier sensing performed in time axis, the present invention proposes a method of performing a carrier sensing in frequency axis, a carrier sensing unit, and a method of making a reservation for a resource.

The carrier sensing unit can be determined by analyzing a carrier sensing granularity, a transmission bandwidth, an accessible bandwidth, a searching bandwidth, and the like of systems existing on the unlicensed band. The unlicensed band can be implicitly or explicitly partitioned based on the carrier sensing unit and a carrier sensing and a resource reservation can be performed. In this case, the carrier sensing unit may exist in a different size. In particular, there are many chances that the carrier sensing unit is not configured with a basic unit. Since the carrier sensing unit is determined based on systems after determining the systems capable of being existed on the unlicensed band, the carrier sensing unit may vary according to how many systems are considered to determine the carrier sensing unit.

For instance, among the systems existing on the unlicensed band, LTE-A eNode B or a UE intends to perform a transmission for a whole 20 MHz bandwidth and WiFi intends to perform a carrier sensing and a transmission in 5 MHz or 10 MHz unit. In order for the LTE-A system to perform the carrier sensing and make a reservation for a resource, it should consider a bandwidth partitioning of a 5 MHz unit, which is used by WiFi. If 20 MHz is precisely divided into four 5 MHz (i.e., a band 1, a band 2, a band 3, and a band 4), the LTE-A system can perform the carrier sensing in a band unit of 5 MHz. After checking whether WiFi system exists, if it is available, each band can be used in a manner of making a reservation for a resource. If a specific band (band 1) is not available, a resource reservation and a transmission can be performed in a manner of selecting a different available band.

Figure 27:
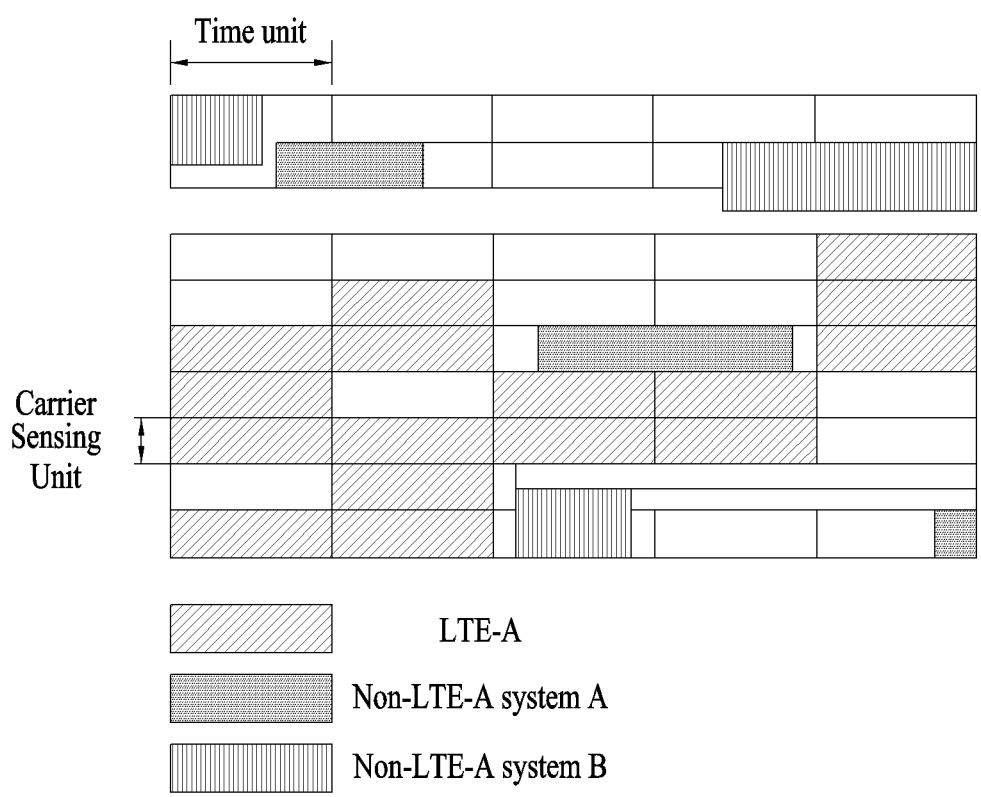
FIG. 27 is a diagram for explaining a carrier sensing unit applicable to embodiments of the present invention.

FIG. 27 is a diagram of an example that an LTE-A system, a non-LTE-A system A, and a non-LTE-A system B perform a carrier sensing in a carrier sensing unit suitable for each system and perform a transmission according to the result of the carrier sensing. For clarity, the carrier sensing unit is divided into an identical size. Yet, an actual band partitioning may not be performed in an identical size. The system A performs the carrier sensing and transmits with one carrier sensing unit (a frequency resource corresponding to one carrier sensing unit is necessary to transmit or one carrier sensing unit corresponds to a maximum transmission band) and the system B performs the carrier sensing and transmits with two carrier sensing units (a frequency resource corresponding to two carrier sensing units is necessary to transmit or two carrier sensing units correspond to a maximum transmission band). LTE-A system performs the carrier sensing for a random number of carrier sensing unit according to a packet size intended to be transmitted and can perform a transmission in a manner of selecting an available band among them. A BUSY sensing interval can be applied to time domain as well.

The aforementioned technology can be performed by both an eNode B and a UE. In case of transmitting from the eNode B to the UE (eNB-to-UE), the eNode B performs the carrier sensing. On the contrary, in case of transmitting from the UE to the eNode B (UE-to-eNB), the UE performs the carrier sensing in general.

Figure 28:
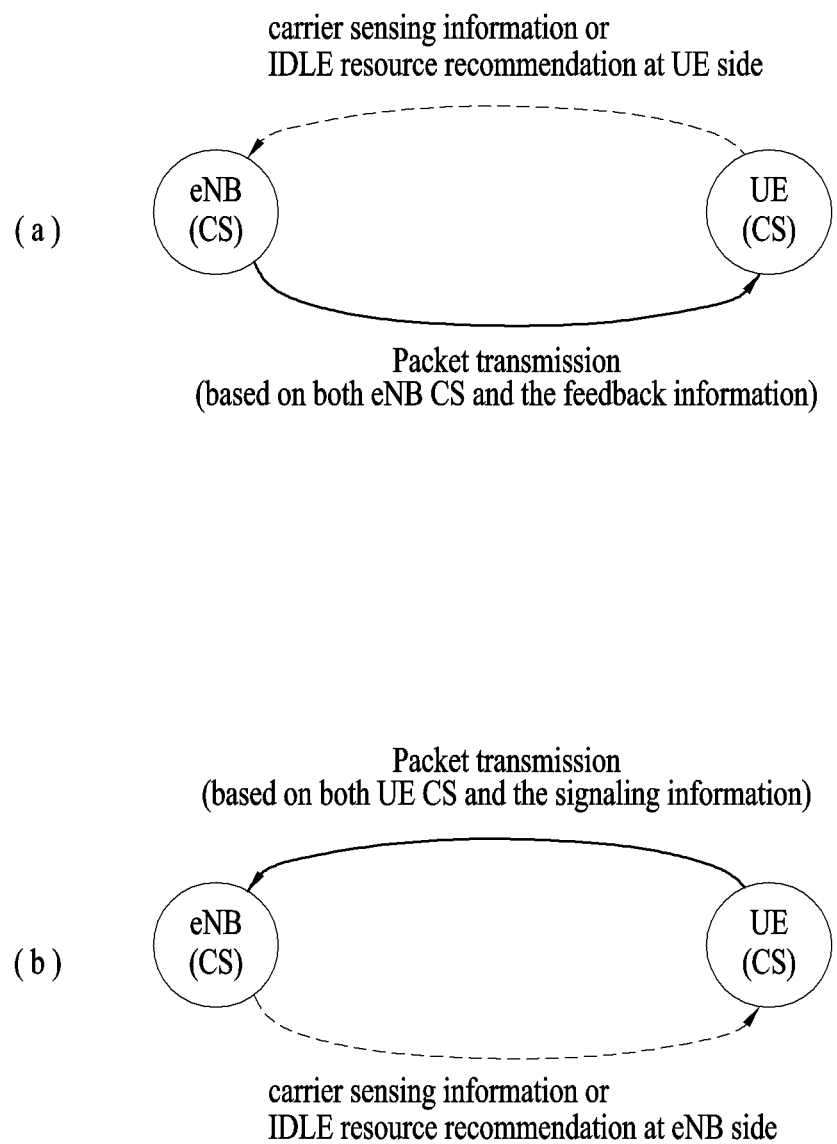
FIG. 28 is a diagram for explaining a sharing of a carrier sensing result applicable to embodiments of the present invention.

Or, the carrier sensing can be performed as a method of complementing each other. In particular, as depicted in FIG. 28 (a), in case that the eNode B performs the carrier sensing, since the eNode B does not know how the UE is interfered, the UE performs the carrier sensing in advance (if necessary, a corresponding resource can be reserved) and informs the eNode B of the result of the carrier sensing. By doing so, the eNode B can attempt to transmit in a manner of collecting the result of the carrier sensing of the eNode B and the carrier sensing information fed back from the UE. It may be able to induce the eNode B to perform a transmission to a resource region of which the UE has recommended (or reserved). Similarly, referring to FIG. 28 (b), since the UE cannot precisely know a resource collision situation experienced by the eNode B, the eNode B identifies a resource situation experienced by the eNode B via the carrier sensing (if necessary a resource can be reserved) and informs the UE of the resource situation. By doing so, the eNode B can induce the UE to perform a transmission to a correct resource region. In this case, the aforementioned additional information can be obtained via a separate channel or a legacy physical channel.

v) Miscellaneous

An ACK/NACK for PDSCH transmission or an ACK/NACK for PUSCH transmission can be configured to be received immediately after a corresponding packet is transmitted. And, ACK/NACK transmission can be configured to be performed only on a licensed band.

The aforementioned explanations can be applied to a TDD as well as a FDD. In case of the TDD, since a frequency band of a DL link is identical to that of an UL link, a licensed band (LTE-A PCC band) can be represented as one band in diagrams to be referred.

Meanwhile, the operation can be more efficiently performed in a manner of intentionally not matching a boundary of a subframe, i.e., in a manner of giving an offset, in a licensed band and an unlicensed band.

The aforementioned embodiment can be applied independently or by a combination of two or more embodiments. For instance, in case of performing both PDSCH transmission and PUSCH transmission on the unlicensed band, it can be understood as the embodiment 2 and the embodiment 3 are simultaneously applied.

Figure 29:
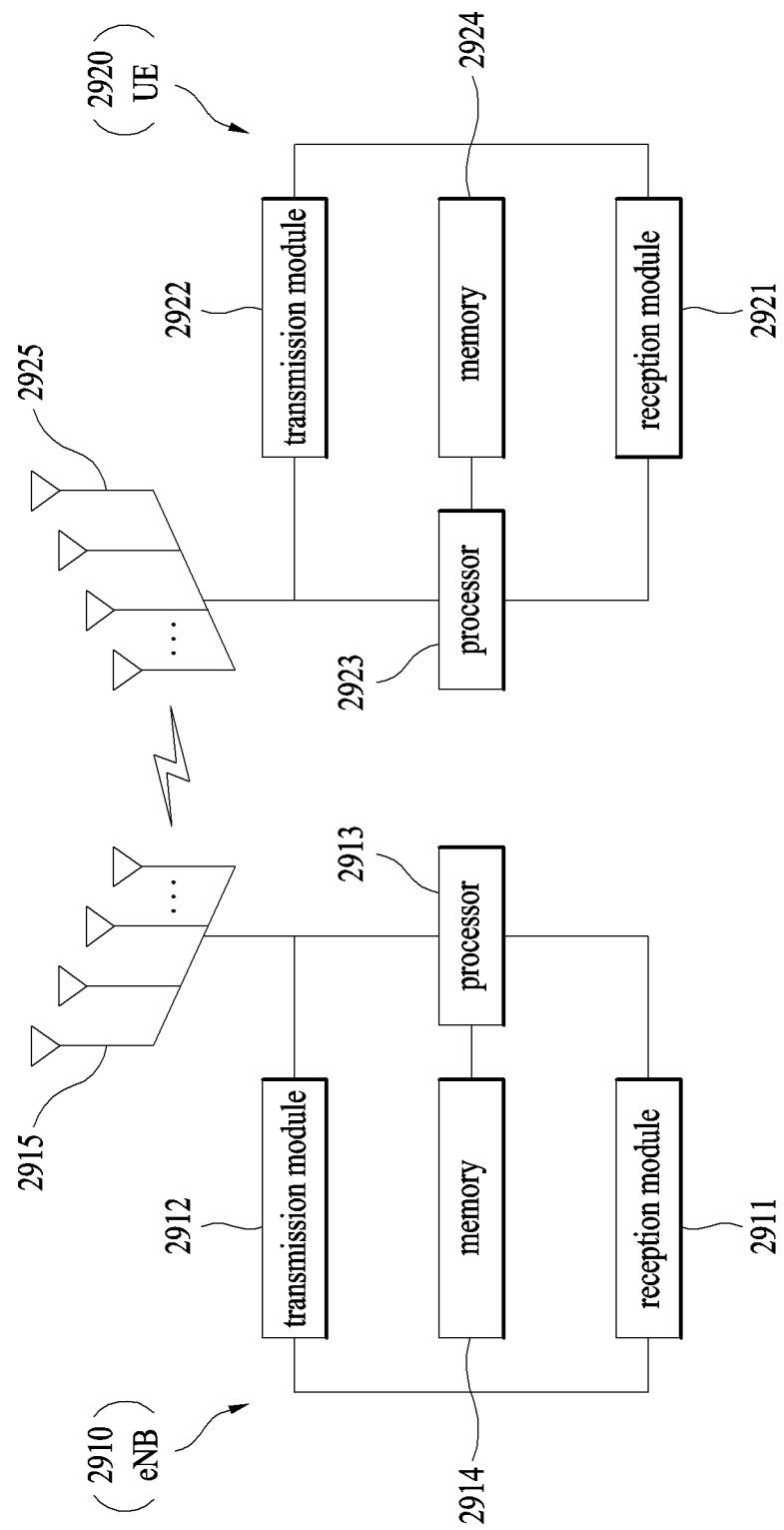
FIG. 29 is a diagram of a configuration of an eNode B device and a user equipment device according to embodiment of the present invention.

FIG. 29 is a diagram of a configuration of an eNode B device and a user equipment device according to embodiment of the present invention.

Referring to FIG. 29, the eNode B 2910 according to the present invention includes a reception module 2911, a transmission module 2912, a processor 2913, a memory 2914, and a plurality of antennas 2915. A plurality of the antennas 2915 means the eNode B capable of supporting MIMO transmission and reception. The reception module 2911 can receive various signals, a data, and information in UL from the UE. The transmission module 2912 can transmit various signals, a data, and information in DL to the UE. The processor 2913 can control overall operations of the eNode B 2610.

If the unlicensed band is identified as available via a carrier sensing, the processor 2913 of the eNode B 2910 according to one embodiment of the present invention is configured to transmit at least one of a preamble or a reservation signal, configured to transmit PDSCH on the unlicensed band immediately after at least one of the preamble or the reservation signal is transmitted. The preamble is configured for a user equipment to acquire reception synchronization of at least one of the reservation signal or the PDSCH.

Besides, the processor 2913 of the eNode B 2910 is configured to perform a function of processing information received by the eNode B 2910, information to be transmitted to an external, and the like. The memory 2914 is configured to store the processed information for a prescribed time and can be substituted by such a configuration element as a buffer (not depicted), or the like.

Subsequently, referring to FIG. 29, the UE 2920 according to the present invention includes a reception module 2921, a transmission module 2922, a processor 2923, a memory 2924, and a plurality of antennas 2925. A plurality of the antennas 2925 means the UE capable of supporting MIMO transmission and reception. The reception module 2921 can receive various signals, a data, and information in DL from the eNode B. The transmission module 2922 can transmit various signals, a data, and information in UL to the eNode B. The processor 2923 can control overall operations of the UE 2920.

The processor 2923 of the UE 2920 according to one embodiment of the present invention is configured to receive at least one of a preamble or a reservation signal from an eNode B on the unlicensed band and configured to receive PDSCH on the unlicensed band. The user equipment can acquire reception synchronization of at least one of the reservation signal or the PDSCH via the preamble.

Besides, the processor 2623 of the UE 2620 is configured to perform a function of processing information received by the UE 2620, information to be transmitted to an external, and the like. The memory 2624 is configured to store the processed information for a prescribed time and can be substituted by such a configuration element as a buffer (not depicted), or the like.

Detail configuration of the eNode B and the UE can be implemented to independently apply the aforementioned contents explained in various embodiments of the present invention or to simultaneously apply two or more embodiments. The overlapped contents are omitted for clarity of explanation.

And, in explaining FIG. 29, explanation on the eNode B 2910 can be identically applied to a device as a main agent of DL transmission or a main agent of UL reception. Explanation on the UE 2920 can be identically applied to a relay as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

Although the aforementioned explanation describes the present invention in a manner of mainly concerning a form applied to a 3GPP LTE mobile communication system, the present invention can be used for various kinds of mobile communication systems with an identical or an equivalent principle.

What is claimed is:

1. A method of transmitting a signal on an unlicensed band by an eNode B in a wireless communication system, the method comprising:

transmitting, by the eNodeB to a user equipment, a first preamble signal for informing a start of transmitting a reservation signal for reserving the unlicensed band, the reservation signal, and a second preamble signal for indicating a subframe boundary of a licensed band used by the eNode B on the unlicensed band, wherein the unlicensed band is identified as available by a carrier sensing of the eNode B; and transmitting, by the eNodeB to the user equipment, a physical downlink shared channel (PDSCH) on the unlicensed band immediately after the second preamble signal is transmitted, wherein the first preamble signal is transmitted before the reservation signal is transmitted, and the second preamble signal is transmitted after the reservation signal is transmitted.

2. The method of claim 1, wherein scheduling information on the PDSCH transmitted on the unlicensed band is transmitted via a physical downlink control channel (PDCCH) transmitted on the licensed band used by the eNode B.

3. The method of claim 1, wherein the first preamble signal comprises identifier information of the user equipment receiving the PDSCH.

4. A method of receiving a signal on an unlicensed band by a user equipment in a wireless communication system, the method comprising:

receiving, by the user equipment from an eNodeB, a first preamble signal for informing a start of transmitting a reservation signal for reserving the unlicensed band, the reservation signal, and a second preamble signal for indicating a subframe boundary of a licensed band used by the eNode B on the unlicensed band, wherein the unlicensed band is identified as available by a carrier sensing of the eNode B; and receiving, by the user equipment from the eNodeB, a physical downlink shared channel (PDSCH) on the unlicensed band after the second preamble signal is received, wherein the first preamble signal is received before the reservation signal is received, and the second preamble signal is received after the reservation signal is received.

5. The method of claim 4, wherein scheduling information on the PDSCH received on the unlicensed band is received via a physical downlink control channel (PDCCH) received on the licensed band used by the eNode B.

6. The method of claim 4, wherein the first preamble signal comprises identifier information of the user equipment receiving the PDSCH.

7. An eNode B in a wireless communication system, the eNode B comprising:

a transmission module; and a processor operably coupled to the transmission module, wherein the processor is configured to:

transmit, through the transmission module to a user equipment, a first preamble signal for informing a start of transmitting a reservation signal for reserving the unlicensed band, the reservation signal, and a second preamble signal for indicating a subframe boundary of a licensed band used by the eNode B on the unlicensed band, wherein the unlicensed band is identified as available via a carrier sensing, and transmit, through the transmission module to the user equipment, a physical downlink shared channel (PDSCH) on the unlicensed band immediately after the second preamble signal is transmitted, wherein the first preamble signal is transmitted before the reservation signal is transmitted, and the second preamble signal is transmitted after the reservation signal is transmitted.

8. A user equipment in a wireless communication system, the user equipment comprising:
a reception module; and
a processor operably coupled to the reception module,
wherein the processor is configured to:
receive, through the reception module from an eNodeB, a first preamble signal for informing a start of transmitting a reservation signal for reserving the unlicensed band, the reservation signal, and a second preamble signal for indicating a subframe boundary of a licensed band used by the eNode B on the unlicensed band,
wherein the unlicensed band is identified as available via a carrier sensing, and
receive, through the reception module from the eNodeB, a physical downlink shared channel (PDSCH) on the unlicensed band after the second preamble signal is received,
wherein the first preamble signal is received before the reservation signal is received, and the second preamble signal is received after the reservation signal is received.

* * * * *